(12) United States Patent
Sanderovich et al.

(10) Patent No.: US 11,375,543 B2
(45) Date of Patent: Jun. 28, 2022

(54) CO-EXISTENCE OF MILLIMETER WAVE COMMUNICATION AND RADAR

(71) Applicant: QUALCOMM Incorporated, San Diego, CA (US)

(72) Inventors: Amichai Sanderovich, Atlit (IL); Gal Basson, Haifa (IL); Assaf Yaakov Kasher, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 15/844,038

(22) Filed: Dec. 15, 2017

(65) Prior Publication Data

US 2018/0199377 A1    Jul. 12, 2018

Related U.S. Application Data

(60) Provisional application No. 62/444,794, filed on Jan. 10, 2017.

(51) Int. Cl.
*H04W 74/08* (2009.01)
*G01S 7/02* (2006.01)
*H04W 16/14* (2009.01)
*H04B 7/0413* (2017.01)
*G01S 7/00* (2006.01)

(52) U.S. Cl.
CPC ......... *H04W 74/0816* (2013.01); *G01S 7/023* (2013.01); *H04B 7/0413* (2013.01); *H04W 16/14* (2013.01); *G01S 7/006* (2013.01)

(58) Field of Classification Search
CPC ....................................................... G01S 7/023
See application file for complete search history.

(56) References Cited

U.S. PATENT DOCUMENTS

| 5,955,984 A | * | 9/1999 | Schober | .................. G01S 13/86 342/159 |
| 7,423,577 B1 | | 9/2008 | McIntire et al. | |

(Continued)

FOREIGN PATENT DOCUMENTS

| TW | 201637474 A | 10/2016 |
| WO | 2016159852 A1 | 10/2016 |

OTHER PUBLICATIONS

International Search Report and Written Opinion—PCT/US2017/067067—ISA/EPO—dated Jul. 16, 2018.

(Continued)

*Primary Examiner* — Marcus E Windrich
(74) *Attorney, Agent, or Firm* — Holland & Hart LLP-CLX/Qualcomm

(57) ABSTRACT

Various aspects of the disclosure relate to co-existence of millimeter wave (mmW) communication and radar. In some aspects, a device that supports mmW communication and radar operations may determine whether or when to conduct radar operations based on information obtained about a nearby mmW network. For example, prior to sending radar signals, the device may monitor for mmW communication signals. As another example, the device may send at least one mmW communication signal to reserve a communication medium for subsequent radar operations. As yet another example, the device may conduct radar operations during idle or allocated time periods defined by the mmW network.

22 Claims, 22 Drawing Sheets

(56) References Cited

U.S. PATENT DOCUMENTS

| | | | |
|---|---|---|---|
| 9,395,436 B2* | 7/2016 | Katuri | G01S 13/87 |
| 10,491,133 B2* | 11/2019 | Logan | H04L 27/2614 |
| 2008/0170559 A1* | 7/2008 | Zumsteg | G01S 7/003 |
| | | | 370/350 |
| 2009/0323782 A1* | 12/2009 | Baker | G01S 7/282 |
| | | | 375/295 |
| 2011/0248180 A1 | 10/2011 | Alexopoulos et al. | |
| 2012/0032833 A1* | 2/2012 | Milligan | G01S 7/006 |
| | | | 342/59 |
| 2013/0300605 A1* | 11/2013 | Celentano | H01Q 3/30 |
| | | | 342/372 |
| 2016/0014773 A1* | 1/2016 | Seok | H04W 76/38 |
| | | | 370/338 |
| 2016/0178730 A1* | 6/2016 | Trotta | G01S 13/931 |
| | | | 342/175 |
| 2018/0059213 A1* | 3/2018 | Wallstedt | H04K 3/226 |
| 2018/0227767 A1* | 8/2018 | Yamazaki | H04W 16/14 |
| 2019/0349926 A1* | 11/2019 | Alanen | H04W 92/20 |
| 2021/0075476 A1* | 3/2021 | Wang | H04L 5/0053 |

OTHER PUBLICATIONS

Kumari P., et al., "Investigating the IEEE 802.11ad Standard for Millimeter Wave Automotive Radar", 2015 IEEE 82nd Vehicular Technology Conference (VTC2015-Fall), 5 pages.

Partial International Search Report—PCT/US2017/067067—ISA/EPO—dated Apr. 10, 2018.

Praveen S., et al., "Miniature Radar for Mobile Devices", 2013 IEEE High Performance Extreme Computing Conference (HPEC), Jan. 1, 2013 (Jan. 1, 2013), pp. 1-8, XP055458953, 001: 10.1109/HPEC.2013.6670337.

Taiwan Search Report—TW106144353—TIPO—Nov. 10, 2021.

* cited by examiner

CO-EXISTENCE OF MILLIMETER WAVE COMMUNICATION AND RADAR

CROSS-REFERENCE TO RELATED APPLICATION(S)

This application claims priority to and the benefit of provisional patent application No. 62/444,794 filed in the U.S. Patent and Trademark Office on Jan. 10, 2017, the entire content of which is incorporated herein by reference.

INTRODUCTION

Various aspects described herein relate to wireless communication and, more particularly but not exclusively, to co-existence of millimeter wave (mmW) communication and radar.

In some wireless communication systems, a wireless communication device may be equipped with multiple transmit antennas and/or multiple receive antennas. One example is a mmW system where multiple antennas are used for beamforming (e.g., in the range of 30 GHz, 60 GHz, etc.). For example, an access point (e.g., a base station) may use beamforming to communicate with different devices served by the access point. Often, the beamforming directions to these two devices are distinct. Consequently, the base station may use a first beam configuration to communicate with a first device and use a second beam configuration to communicate with a second device. In some scenarios, this communication may take place in a time-division-multiplexing (TDM) or time-division-duplexing (TDD) manner. That is, the base station transmits to the first device in a first time interval and transmits to the second device subsequently in a second time interval.

FIG. 1 illustrates an example of a communication system 100 where a mmW base station (BS) 102 communicates with a first mmW user equipment (UE) 104 and a second mmW UE 106 via different beamforming directions. As indicated by a set of beams 108, the mmW base station 102 may communicate via any one of a plurality of directional beams. As indicated by a set of beams 110, the first mmW UE 104 may communicate via any one of a plurality of directional beams. As indicated by a set of beams 112, the second mmW UE 106 may communicate via any one of a plurality of directional beams. For example, the base station 102 may communicate with the first mmW UE 104 via a first beamforming direction 114 and communicate with the second mmW UE 106 via a second beamforming direction 116.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication. The apparatus includes: an interface configured to obtain millimeter wave communication information; and a processing system configured to control a radar operation at the apparatus according to the millimeter wave communication information.

In some aspects, the disclosure provides a method of communication. The method includes: obtaining millimeter wave communication information; and controlling a radar operation at an apparatus according to the millimeter wave communication information.

In some aspects, the disclosure provides an apparatus configured for communication. The apparatus includes: means for obtaining millimeter wave communication information; and means for controlling a radar operation at the apparatus according to the millimeter wave communication information.

In some aspects, the disclosure provides a wireless node. The wireless node includes: a receiver configured to receive millimeter wave communication information; and a processing system configured to control a radar operation at the wireless node according to the millimeter wave communication information.

In some aspects, the disclosure provides a computer-readable medium (e.g., a non-transitory computer-readable medium) storing computer-executable code. The computer-readable medium includes code to: obtain millimeter wave communication information; and control a radar operation at an apparatus according to the millimeter wave communication information.

In some aspects, the disclosure provides an apparatus configured for communication. The apparatus includes: an interface configured to output at least one millimeter wave communication signal for transmission on a channel; and a processing system configured to commence a radar operation at the apparatus after the at least one millimeter wave communication signal is output, wherein the radar operation involves the interface outputting at least one radar signal for transmission on the channel.

In some aspects, the disclosure provides a method of communication. The method includes: outputting at least one millimeter wave communication signal for transmission on a channel; and commencing a radar operation at an apparatus after the at least one millimeter wave communication signal is output, wherein the radar operation involves outputting at least one radar signal for transmission on the channel.

In some aspects, the disclosure provides an apparatus configured for communication. The apparatus includes: means for outputting at least one millimeter wave communication signal for transmission on a channel; and means for commencing a radar operation at the apparatus after the at least one millimeter wave communication signal is output, wherein the radar operation involves the means for outputting at least one radar signal for transmission on the channel.

In some aspects, the disclosure provides a wireless node. The wireless node includes: a transmitter configured to transmit at least one millimeter wave communication signal on a channel; and a processing system configured to commence a radar operation at the wireless node after the at least one millimeter wave communication signal is transmitted, wherein the radar operation involves the transmitter transmitting at least one radar signal on the channel.

In some aspects, the disclosure provides a computer-readable medium (e.g., a non-transitory computer-readable medium) storing computer-executable code. The computer-readable medium includes code to: output at least one millimeter wave communication signal for transmission on a channel; and commence a radar operation at an apparatus after the at least one millimeter wave communication signal is output, wherein the radar operation involves outputting at least one radar signal for transmission on the channel.

In some aspects, the disclosure provides an apparatus configured for communication. The apparatus includes: an interface configured to obtain a signal from a millimeter wave channel; and a processing system configured to: determine whether the signal is a radar signal, and disable operation of a receiver on the millimeter wave channel if the signal is a radar signal.

In some aspects, the disclosure provides a method of communication. The method includes: obtaining a signal from a millimeter wave channel; determining whether the signal is a radar signal; and disabling operation of a receiver on the millimeter wave channel if the signal is a radar signal.

In some aspects, the disclosure provides an apparatus configured for communication. The apparatus includes: means for obtaining a signal from a millimeter wave channel; means for determining whether the signal is a radar signal; and means for disabling operation of a receiver on the millimeter wave channel if the signal is a radar signal.

In some aspects, the disclosure provides a wireless node. The wireless node includes: a receiver configured to receive at least one signal from a channel; a processing system configured to: a receiver configured to receive a signal from a millimeter wave channel; and a processing system configured to: determine whether the signal is a radar signal, and disable operation of the receiver on the millimeter wave channel if the signal is a radar signal.

In some aspects, the disclosure provides a computer-readable medium (e.g., a non-transitory computer-readable medium) storing computer-executable code. The computer-readable medium includes code to: obtain a signal from a millimeter wave channel; determine whether the signal is a radar signal; and disable operation of a receiver on the millimeter wave channel if the signal is a radar signal.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim. For example, a method of communication may include obtaining millimeter wave communication information; and controlling a radar operation at an apparatus according to the millimeter wave communication information.

Devices such as mmW communication devices typically use several antenna elements in each antenna array. These antenna elements can also be used by the device for radar operation (e.g., e.g. gesture recognition, mapping, etc.). Conventional radar equipment usually sends signals to all directions and receives signals from all directions. Operating such a device in the same room where a mmW network is operating can result in very significant disruptions to the service of the mmW network.

The disclosure relates in some aspects to techniques for facilitating co-existence of mmW communication and radar. In some aspects, a device that supports mmW communication and radar operations may determine whether or when to conduct radar operations based on information obtained about a nearby mmW network. For example, prior to sending radar signals, the device may monitor for mmW communication signals. As another example, the device may send at least one mmW communication signal to reserve a communication medium for subsequent radar operations. As yet another example, the device may conduct radar operations during idle or allocated time periods defined by the mmW network.

Figure 1:
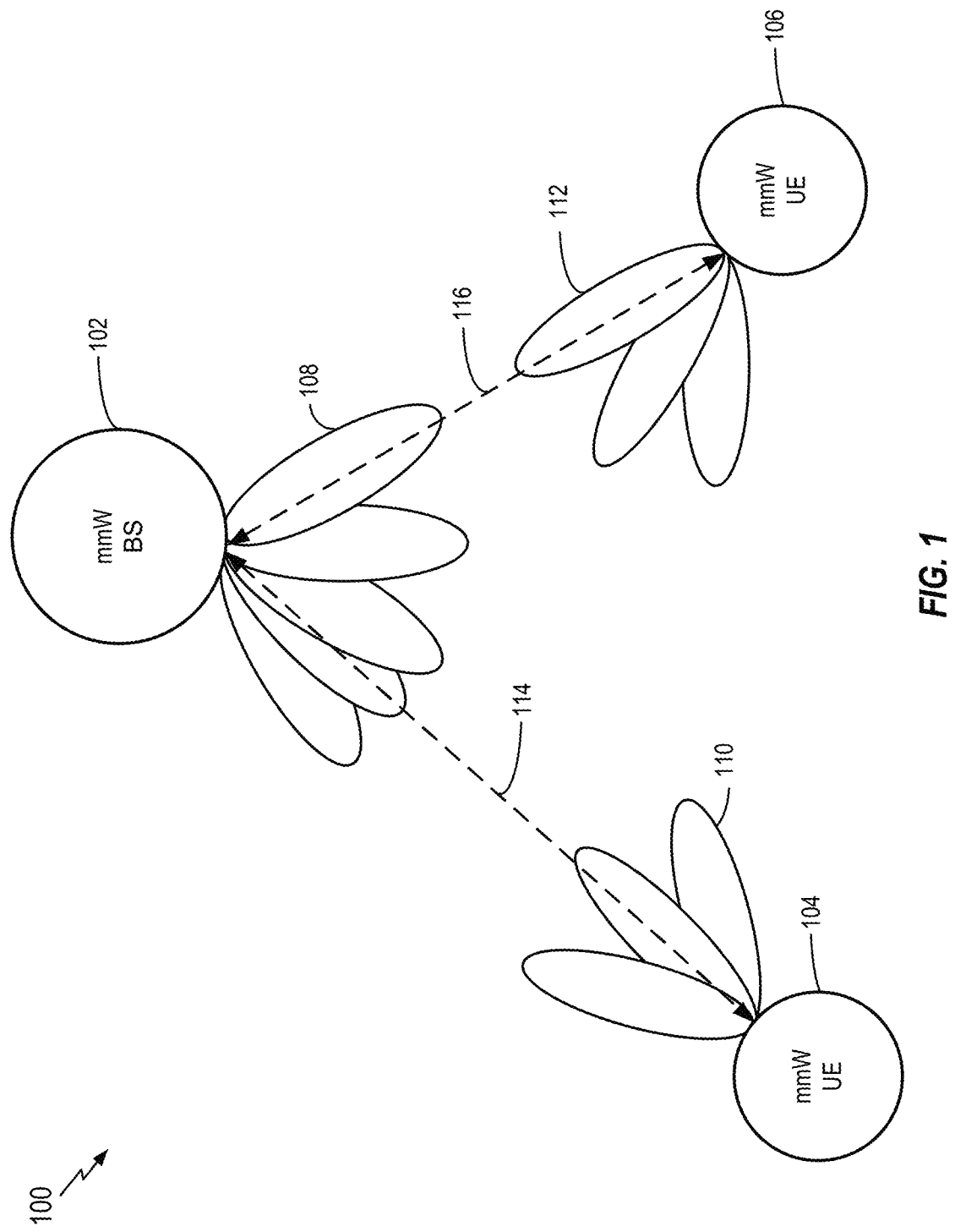
FIG. 1 illustrates an example communication system employing beamforming within which aspects of the disclosure may be implemented.
Figure 2:
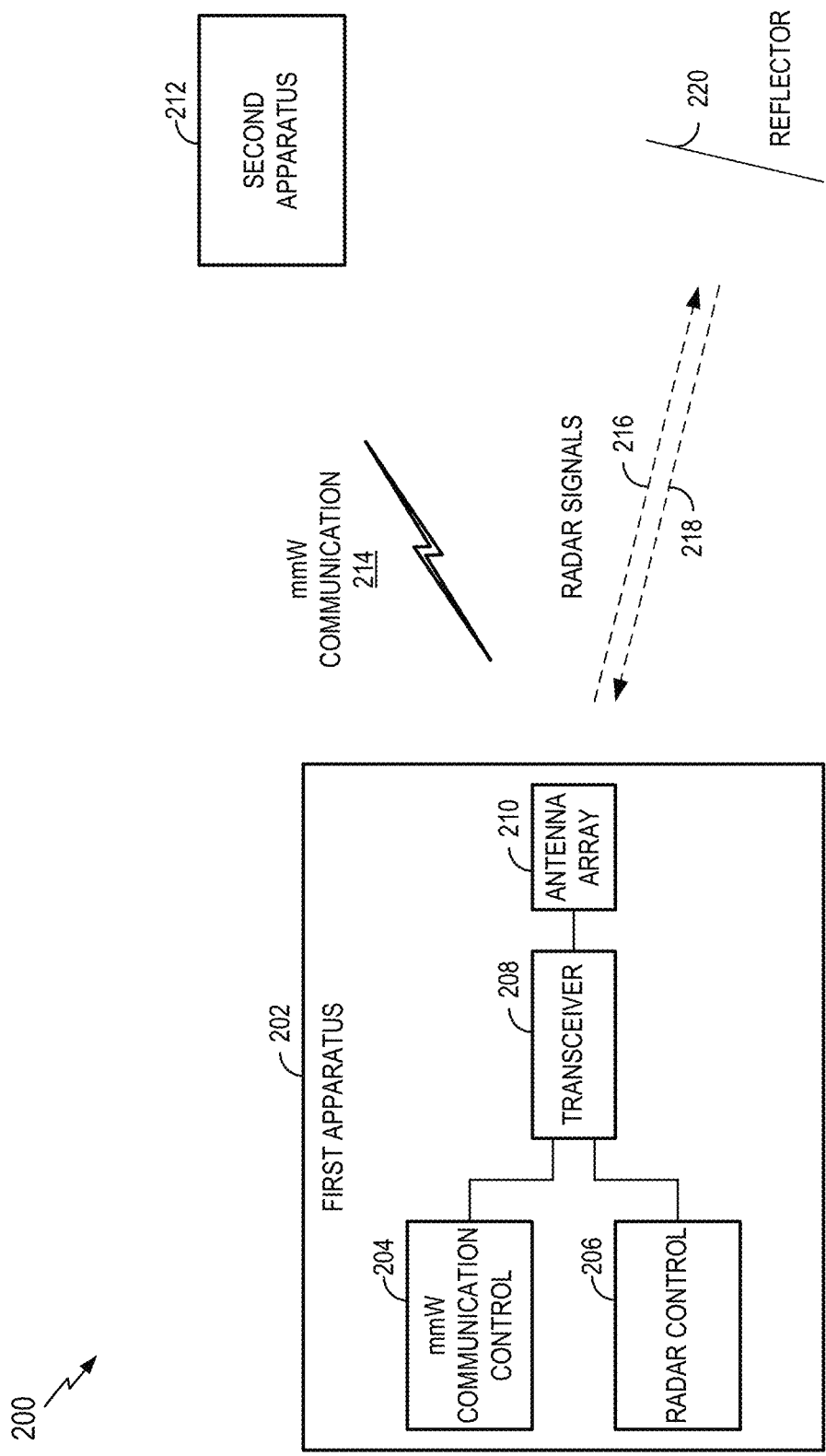
FIG. 2 illustrates an example communication system that uses mmW communication and radar co-existence techniques in accordance with some aspects of the disclosure.

FIG. 2 illustrates a wireless communication system 200 where a first apparatus 202 supports mmW communication and radar co-existence. The first apparatus 202 employs mmW communication control 204 and radar control 206 to control mmW communication and radar signaling, respectively, via a transceiver 208 and an antenna array 210. For example, the first apparatus 202 may communicate with a second apparatus 212 via mmW communication 214 (e.g., IEEE 802.11ay communication, LTE communication, 5G communication, or some other form of communication that uses a mmW band). In addition, the first apparatus 202 may transmit radar signals 216 and then process any radar signals 218 that are reflected back from a reflector 220. In some aspects, the mmW communication and the radar signaling may use the same radio frequency band or bands (e.g., designed mmW bands).

In accordance with the teachings herein, the first apparatus 202 may control radar operations based on at least one mmW communication signal received from the second apparatus 212 or some other apparatus. For example, the first apparatus 202 may monitor for base station signaling (e.g., basic service set (BSS) signals) or access signaling (e.g., clear channel assessment (CCA) signals and/or network allocation vector (NAV) signals) to determine whether the first apparatus 202 can use a particular channel for radar. As another example, the first apparatus 202 may send at least one control allocation signal to clear a channel before commencing radar operations on the channel. Examples of control allocation signals include, without limitation, a request-to-send (RTS), a clear-to-send (CTS), a clear-to-send-to-self (CTS2S), a directional multi-gigabit clear-to-send (DMG CTS), a sector sweep (SSW) frame, and a short sector sweep (SSSW) frame. As yet another example, the first apparatus 202 may receive sleep period (e.g., doze period) information, communication interval (e.g., beacon time interval (BTI)) information, or allocation period (e.g., service period allocation) information from the second apparatus 212 or some other apparatus and use this information to determine when to conduct radar operations on a channel.

Figure 3:
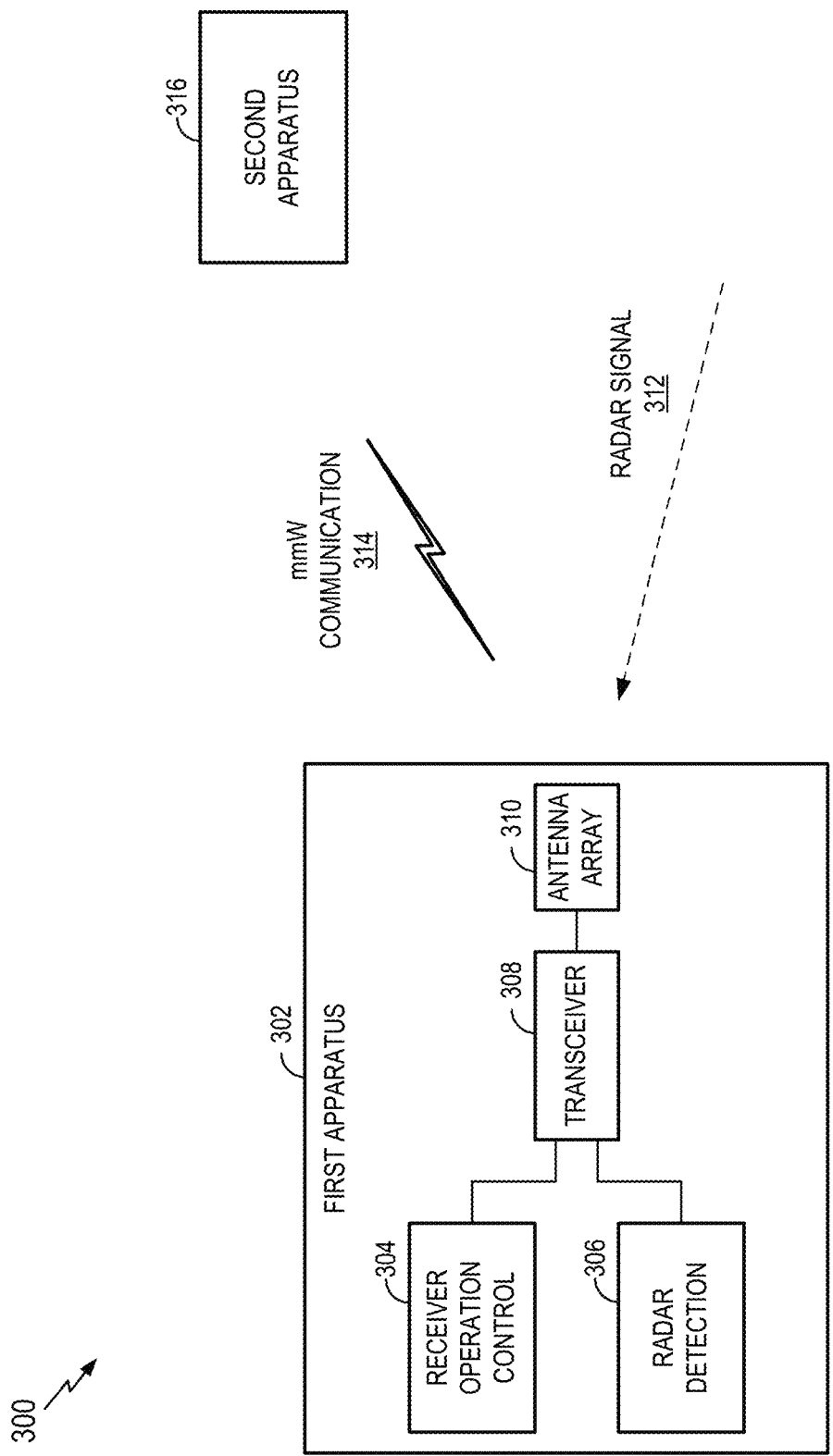
FIG. 3 illustrates another example communication system that uses mmW communication and radar co-existence techniques in accordance with some aspects of the disclosure.

FIG. 3 illustrates another wireless communication system 300 where a first apparatus 302 supports mmW communication and radar co-existence. The first apparatus 302 employs receiver operation (e.g., mmW communication) control 304 and radar detection 306 to control receiver operation and detect radar signals, respectively, via a transceiver 308 and an antenna array 310. For example, the first apparatus 302 may disable receiver operation on a channel upon detection of a radar signal 312 on that channel. In this way, the first apparatus 302 may avoid attempting to decode mmW communication 314 (e.g., IEEE 802.11ay communication, LTE communication, 5G communication, or some other form of communication that uses a mmW band) from a second apparatus 316 or some other apparatus. In some aspects, the mmW communication and the radar signaling may use the same radio frequency band or bands (e.g., designed mmW bands).

The radar signals may take different forms in different implementations. For example, the radar signals may include a Golay sequence, a chirp signal, an orthogonal frequency divisional multiplex (OFDM) signal, pulse repetition signals, frequency modulated continuous wave (FM-CW) signals, continuous wave (CW) signals, any other radar signal common in the art, or any combination thereof.

The teachings herein are applicable to different types of apparatuses in different implementations. For example, the teachings herein may be implemented in an access point (e.g., a base station), an access terminal (e.g., a station), a cluster BSS, or some other suitable apparatus.

Example Processes

FIGS. 4-8 illustrates several example processes that may be performed, for example, by the first apparatus 202 of FIG. 2 or by some other suitable apparatus (e.g., that supports co-existence in accordance with the teachings herein).

Figure 4:
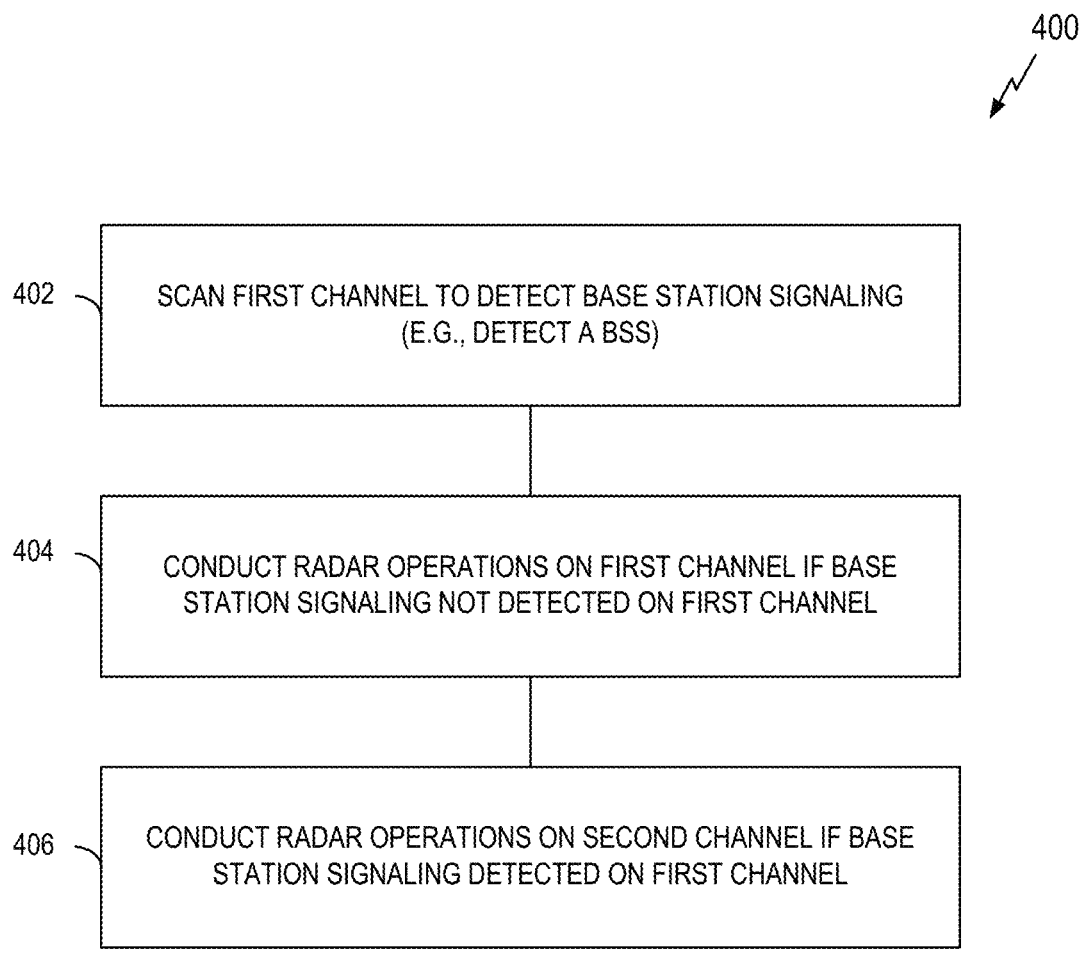
FIG. 4 is a flowchart illustrating a first example of a co-existence process in accordance with some aspects of the disclosure.

FIG. 4 illustrates a process 400 for communication in accordance with some aspects of the disclosure. For example, before radar operation is started, an apparatus may scan one or more channels to detect base station signaling (e.g., detect a BSS). The process 400 may take place within a processing system (e.g., the processing system 1304 of FIG. 13), which may be located in an AP, an AT, or some other suitable apparatus. Of course, in various aspects within the scope of the disclosure, the process 400 may be implemented by any suitable apparatus capable of supporting communication-related operations.

At block 402, an apparatus scans a first channel to detect base station signaling (e.g., detect a BSS).

At block 404, the apparatus conducts radar operations on the first channel if the base station signaling is not detected on the first channel.

At block 406, the apparatus conducts radar operations on the second channel if the base station signaling is detected on the first channel.

Figure 5:
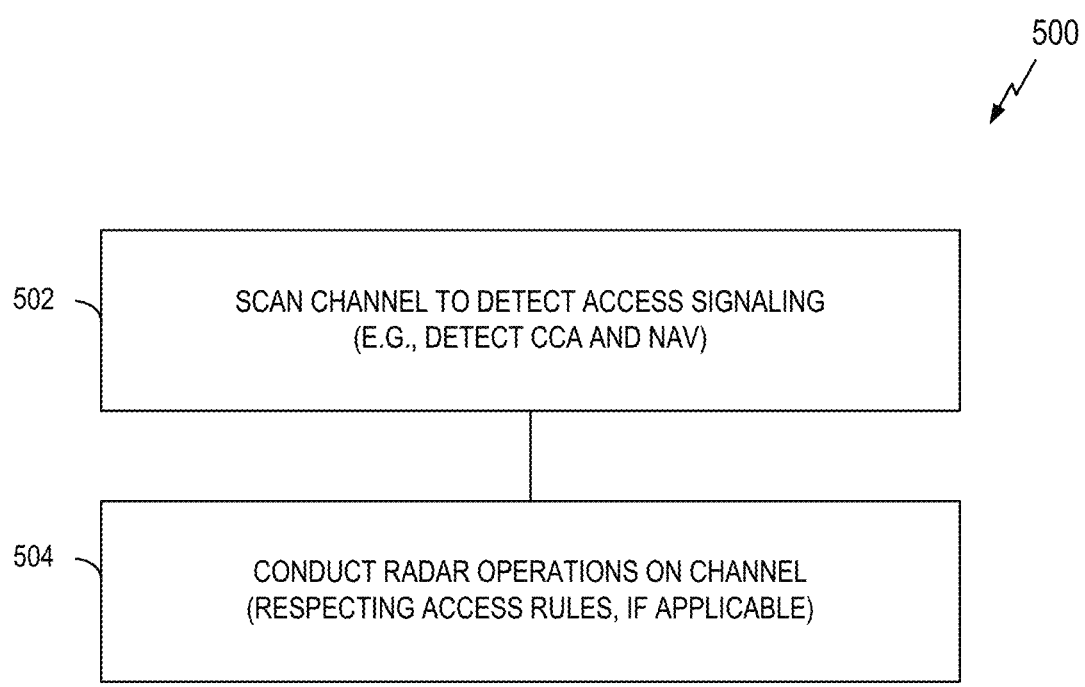
FIG. 5 is a flowchart illustrating a second example of a co-existence process in accordance with some aspects of the disclosure.

FIG. 5 illustrates a process 500 for communication in accordance with some aspects of the disclosure. For example, a radar apparatus may respect the access rules for mmW communication (e.g., CCA+NAV). The process 500 may take place within a processing system (e.g., the processing system 1304 of FIG. 13), which may be located in an AP, an AT, or some other suitable apparatus. Of course, in various aspects within the scope of the disclosure, the process 500 may be implemented by any suitable apparatus capable of supporting communication-related operations.

At block 502, an apparatus scans a channel to detect access signaling (e.g., CCA and NAV).

At block 504, the apparatus conducts radar operations on the channel (e.g., respecting the access rules for CCA and NAV, if applicable).

Figure 6:
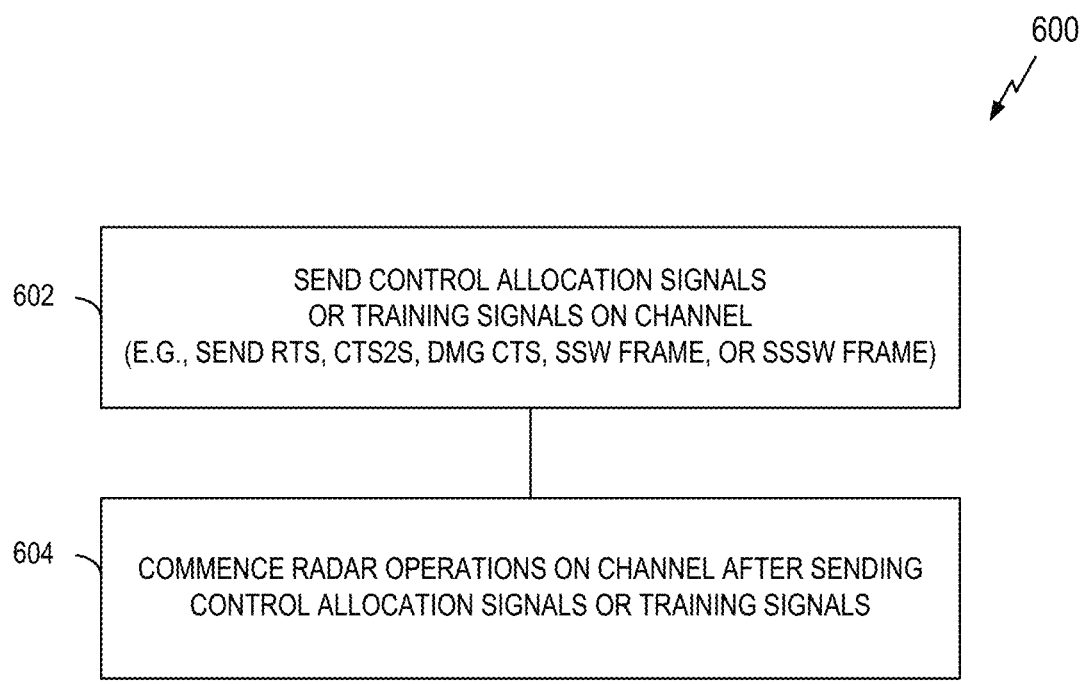
FIG. 6 is a flowchart illustrating a third example of a co-existence process in accordance with some aspects of the disclosure.

FIG. 6 illustrates a process 600 for communication in accordance with some aspects of the disclosure. For example, before starting a radar scan, an apparatus may send at least one control allocation signal or at least one training signal (e.g., RTS or CTS-to-self (CTS2S) or DMG CTS or SSW or SSSW frame) in either directed mode or omnidirectional mode to inform the other nodes in the network that a transmission is going on, thus avoiding interfering with the network. The process 600 may take place within a processing system (e.g., the processing system 1304 of FIG. 13), which may be located in an AP, an AT, or some other suitable apparatus. Of course, in various aspects within the scope of the disclosure, the process 600 may be implemented by any suitable apparatus capable of supporting communication-related operations.

At block 602, an apparatus sends at least one control allocation signal (e.g., an RTS or a CTS2S or a DMG CTS) or at least one training signal (e.g., an SSW or SSSW frame) on a channel.

At block 604, the apparatus commences radar operations on the channel after sending the at least one control allocation signal of the at least one training signal.

Figure 7:
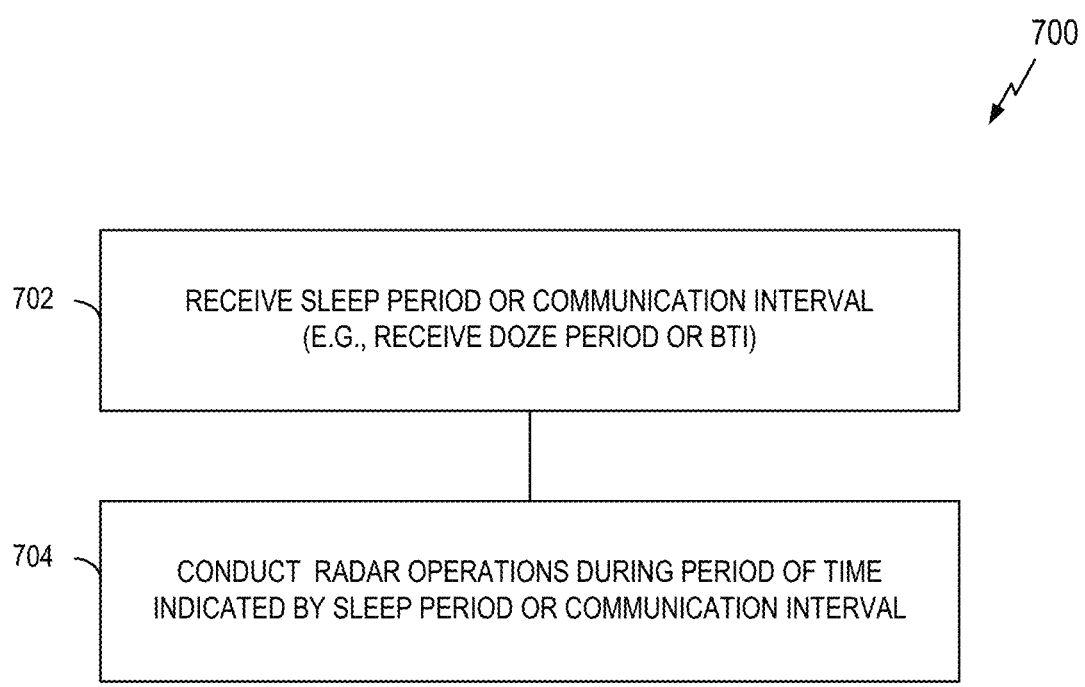
FIG. 7 is a flowchart illustrating a fourth example of a co-existence process in accordance with some aspects of the disclosure.

FIG. 7 illustrates a process 700 for communication in accordance with some aspects of the disclosure. For example, an apparatus may listen to sleep periods (e.g., doze periods) and communication intervals (e.g., a beacon time interval, BTI), and time the radar scan to these times. The process 700 may take place within a processing system (e.g., the processing system 1304 of FIG. 13), which may be located in an AP, an AT, or some other suitable apparatus. Of course, in various aspects within the scope of the disclosure, the process 700 may be implemented by any suitable apparatus capable of supporting communication-related operations.

At block 702, an apparatus receives sleep period (e.g., doze period) or communication interval (e.g., BTI) information.

At block 704, the apparatus conducts radar operations during a period of time indicated by the sleep period or the communication interval.

Figure 8:
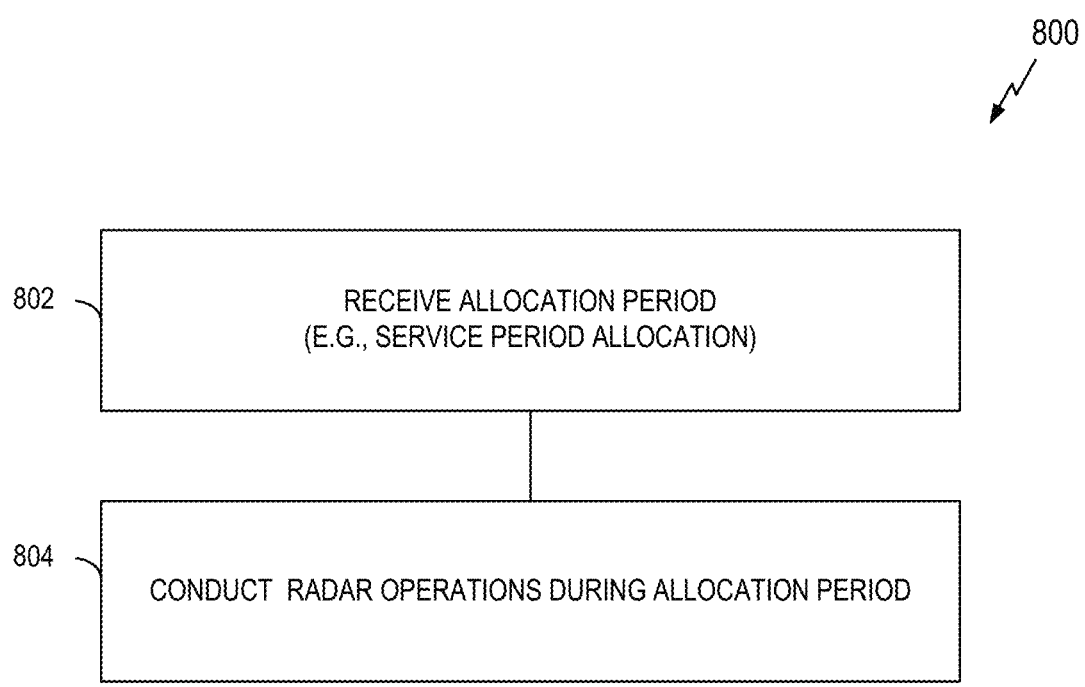
FIG. 8 is a flowchart illustrating a fifth example of a co-existence process in accordance with some aspects of the disclosure.

FIG. 8 illustrates a process 800 for communication in accordance with some aspects of the disclosure. For example, an apparatus may use an allocated period (e.g., a service period allocation) in the BSS for the radar scan times. The process 800 may take place within a processing system (e.g., the processing system 1304 of FIG. 13), which may be located in an AP, an AT, or some other suitable apparatus. Of course, in various aspects within the scope of the disclosure, the process 800 may be implemented by any suitable apparatus capable of supporting communication-related operations.

At block 802, an apparatus receives allocation period information (e.g., a service period allocation).

At block 804, the apparatus conducts radar operations during the allocation period.

Example Wireless Communication System

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols such as 802.11ad, 802.11ay, and 802.11az.

In some aspects, wireless signals may be transmitted according to an 802.11 protocol using orthogonal frequency-division multiplexing (OFDM), direct-sequence spread spectrum (DSSS) communication, a combination of OFDM and DSSS communication, single carrier, or other schemes.

Certain of the devices described herein may further implement Multiple Input Multiple Output (MIMO) technology and be implemented as part of an 802.11 protocol. A MIMO system employs multiple ($N_t$) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

Certain of the devices described herein may further implement multi-user technology and be implemented as part of an 802.11 protocol. For example, such a device may employ orthogonal frequency domain multiple access (OFDMA) and/or multi-user MIMO (MU-MIMO).

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also include, be implemented as, or known as a Transmit Receive Point (TRP), a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 9:
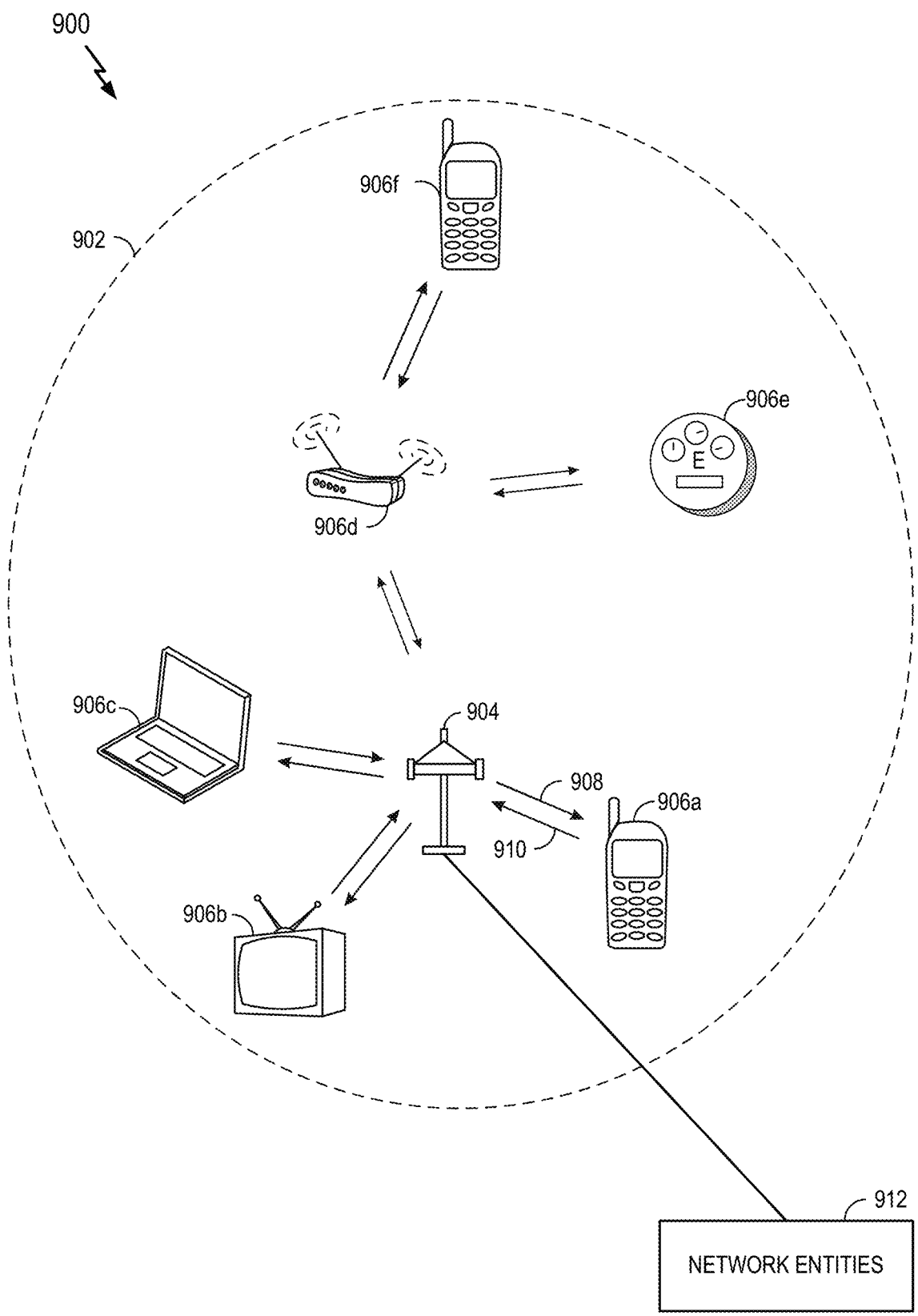
FIG. 9 illustrates an example of a wireless communication system in which aspects of the present disclosure may be employed.

FIG. 9 illustrates an example of a wireless communication system 900 in which aspects of the present disclosure may be employed. The wireless communication system 900 may operate pursuant to a wireless standard, for example the 802.11 standard. The wireless communication system 900 may include an AP 904, which communicates with STAs 906a, 906b, 906c, 906d, 906e, and 906f (collectively STAs 906).

STAs 906e and 906f may have difficulty communicating with the AP 904 or may be out of range and unable to communicate with the AP 904. As such, another STA 906d may be configured as a relay device (e.g., a device including STA and AP functionality) that relays communication between the AP 904 and the STAs 906e and 906f.

A variety of processes and methods may be used for transmissions in the wireless communication system 900 between the AP 904 and the STAs 906. For example, signals may be sent and received between the AP 904 and the STAs 906 in accordance with OFDM/OFDMA techniques. If this is the case, the wireless communication system 900 may be referred to as an OFDM/OFDMA system. Alternatively, signals may be sent and received between the AP 904 and the STAs 906 in accordance with CDMA techniques. If this is the case, the wireless communication system 900 may be referred to as a CDMA system.

A communication link that facilitates transmission from the AP 904 to one or more of the STAs 906 may be referred to as a downlink (DL) 908, and a communication link that facilitates transmission from one or more of the STAs 906 to the AP 904 may be referred to as an uplink (UL) 910. Alternatively, a downlink 908 may be referred to as a forward link or a forward channel, and an uplink 910 may be referred to as a reverse link or a reverse channel.

The AP 904 may act as a base station and provide wireless communication coverage in a basic service area (BSA) 902. The AP 904 along with the STAs 906 associated with the AP 904 and that use the AP 904 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 904 or to some other access point in the network (not shown).

Each of the access points may communicate with one or more network entities (represented, for convenience, by network entities 912 in FIG. 9), including each other, to facilitate wide area network connectivity. A network entity may take various forms such as, for example, one or more radio and/or core network entities. Thus, in various implementations the network entities 912 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 900 might not have a central AP 904, but rather may function as a peer-to-peer network between the STAs 906. Accordingly, the functions of the AP 904 described herein may alternatively be performed by one or more of the STAs 906. Also, as mentioned above, a relay may incorporate at least some of the functionality of an AP and a STA.

Figure 10:
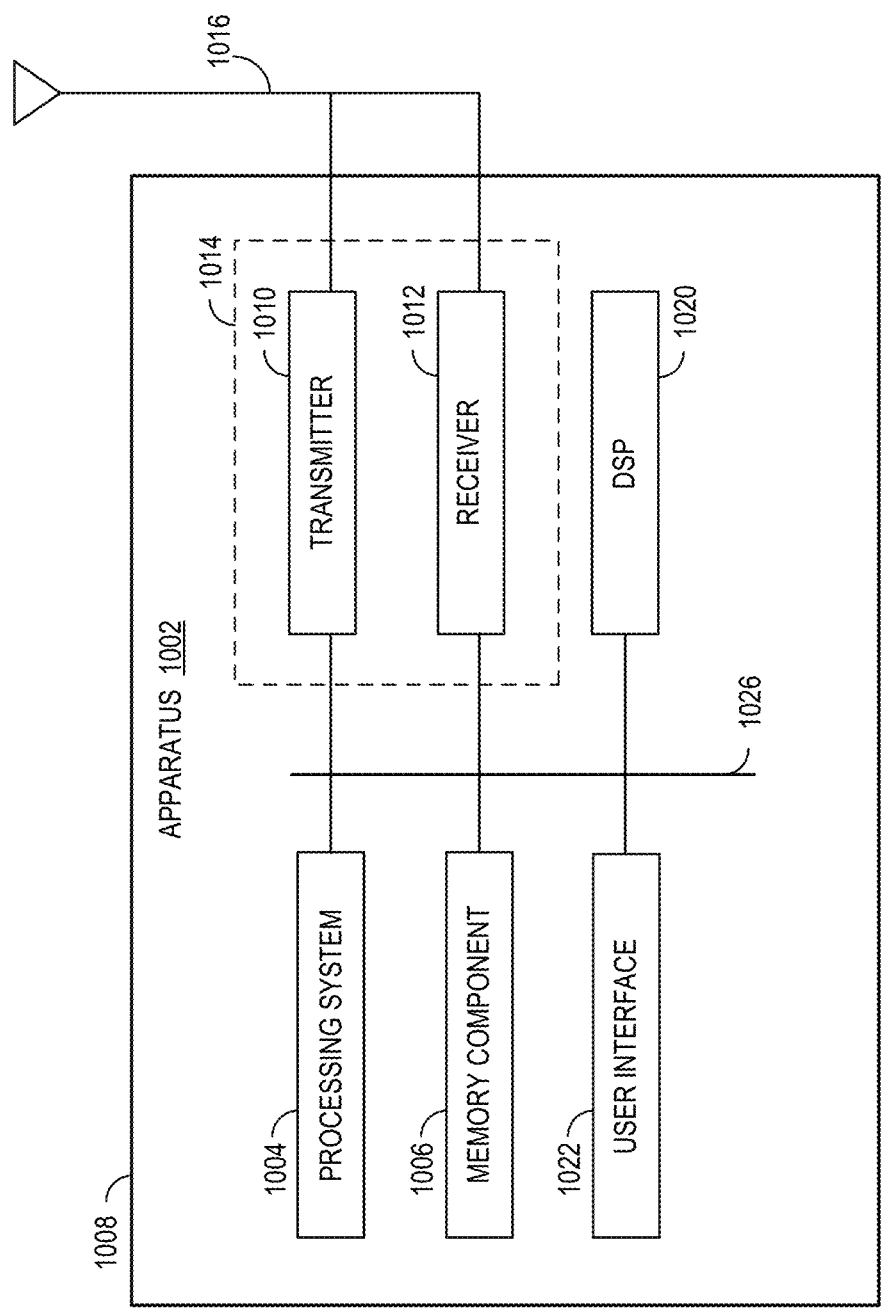
FIG. 10 is a functional block diagram of an example apparatus that may be employed within a wireless communication system in accordance with some aspects of the disclosure.

FIG. 10 illustrates various components that may be utilized in an apparatus 1002 (e.g., a wireless device) that may be employed within the wireless communication system 900. The apparatus 1002 is an example of a device that may be configured to implement the various methods described herein. For example, the apparatus 1002 may be implemented as the AP 904, a relay (e.g., the STA 906d), or one of the STAs 906 of FIG. 9. As another example, the apparatus 1002 may correspond to the first apparatus 202 of FIG. 2 or the first apparatus 302 of FIG. 3.

The apparatus 1002 may include a processing system 1004 that controls operation of the apparatus 1002. The processing system 1004 may also be referred to as a central processing unit (CPU). A memory component 1006 (e.g., including a memory device), which may include both read-only memory (ROM) and random access memory (RAM), provides instructions and data to the processing system 1004. A portion of the memory component 1006 may also include non-volatile random access memory (NVRAM). The processing system 1004 typically performs logical and arithmetic operations based on program instructions stored within the memory component 1006. The instructions in the memory component 1006 may be executable to implement the methods described herein.

When the apparatus 1002 is implemented or used as a transmitting node, the processing system 1004 may be configured to select one of a plurality of media access control (MAC) header types, and to generate a packet having that MAC header type. For example, the processing system 1004 may be configured to generate a packet including a MAC header and a payload and to determine what type of MAC header to use.

When the apparatus 1002 is implemented or used as a receiving node, the processing system 1004 may be configured to process packets of a plurality of different MAC header types. For example, the processing system 1004 may be configured to determine the type of MAC header used in a packet and process the packet and/or fields of the MAC header.

The processing system 1004 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1002 may also include a housing 1008 that may include a transmitter 1010 and a receiver 1012 to allow transmission and reception of data between the apparatus 1002 and a remote location. The transmitter 1010 and receiver 1012 may be combined into single communication device (e.g., a transceiver 1014). An antenna 1016 may be attached to the housing 1008 and electrically coupled to the transceiver 1014. The apparatus 1002 may also include (not shown) multiple transmitters, multiple receivers, multiple transceivers, and/or multiple antennas. A transmitter 1010 and a receiver 1012 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 1010 may be configured to wirelessly transmit packets having different MAC header types. For example, the transmitter 1010 may be configured to transmit packets with different types of headers generated by the processing system 1004, discussed above.

The receiver 1012 may be configured to wirelessly receive packets having different MAC header type. In some aspects, the receiver 1012 is configured to detect a type of a MAC header used and process the packet accordingly.

The receiver 1012 may be used to detect and quantify the level of signals received by the transceiver 1014. The receiver 1012 may detect such signals as total energy, energy per subcarrier per symbol, power spectral density and other signals. The apparatus 1002 may also include a digital signal processor (DSP) 1020 for use in processing signals. The DSP 1020 may be configured to generate a data unit for transmission. In some aspects, the data unit may include (e.g., may be) a physical layer data unit (PPDU). In some aspects, the PPDU is referred to as a packet.

The apparatus 1002 may further include a user interface 1022 in some aspects. The user interface 1022 may include a keypad, a microphone, a speaker, and/or a display. The user interface 1022 may include any element or component that conveys information to a user of the apparatus 1002 and/or receives input from the user.

The various components of the apparatus 1002 may be coupled together by a bus system 1026. The bus system 1026 may include a data bus, for example, as well as a power bus, a control signal bus, and a status signal bus in addition to the data bus. Those of skill in the art will appreciate the components of the apparatus 1002 may be coupled together or accept or provide inputs to each other using some other mechanism.

Although a number of separate components are illustrated in FIG. 10, one or more of the components may be combined or commonly implemented. For example, the processing system 1004 may be used to implement not only the functionality described above with respect to the processing system 1004, but also to implement the functionality described above with respect to the transceiver 1014 and/or the DSP 1020. Further, each of the components illustrated in FIG. 10 may be implemented using a plurality of separate elements. Furthermore, the processing system 1004 may be used to implement any of the components, modules, circuits, or the like described below, or each may be implemented using a plurality of separate elements.

For ease of reference, when the apparatus 1002 is configured as a transmitting node, it is hereinafter referred to as an apparatus 1002t. Similarly, when the apparatus 1002 is configured as a receiving node, it is hereinafter referred to as an apparatus 1002r. A device in the wireless communication system 900 may implement only functionality of a transmitting node, only functionality of a receiving node, or functionality of both a transmitting node and a receive node.

As discussed above, the apparatus 1002 may take the form of an AP 904 or a STA 906, and may be used to transmit and/or receive communication having a plurality of MAC header types.

The components of FIG. 10 may be implemented in various ways. In some implementations, the components of FIG. 10 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 10 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 11:
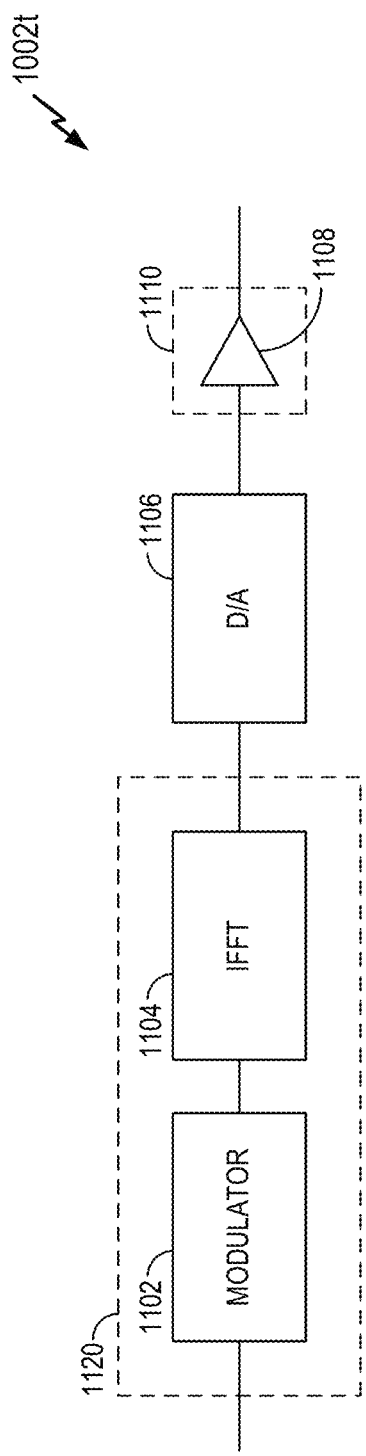
FIG. 11 is a functional block diagram of example components that may be utilized in the apparatus of FIG. 10 to transmit wireless communication.

As discussed above, the apparatus 1002 may take the form of an AP 904 or a STA 906, a relay, or some other type of apparatus, and may be used to transmit and/or receive communication. FIG. 11 illustrates various components that may be utilized in the apparatus 1002t to transmit wireless communication. The components illustrated in FIG. 11 may be used, for example, to transmit OFDM communication. In some aspects, the components illustrated in FIG. 11 are used to generate and transmit packets to be sent over a bandwidth of less than or equal to 1 MHz.

The apparatus 1002t of FIG. 11 may include a modulator 1102 configured to modulate bits for transmission. For example, the modulator 1102 may determine a plurality of symbols from bits received from the processing system 1004 (FIG. 10) or the user interface 1022 (FIG. 10), for example by mapping bits to a plurality of symbols according to a constellation. The bits may correspond to user data or to control information. In some aspects, the bits are received in codewords. In one aspect, the modulator 1102 may include (e.g., may be) a QAM (quadrature amplitude modulation) modulator, for example, a 16-QAM modulator or a 64-QAM modulator. In other aspects, the modulator 1102 may include (e.g., may be) a binary phase-shift keying (BPSK) modulator, a quadrature phase-shift keying (QPSK) modulator, or an 8-PSK modulator.

The apparatus 1002t may further include a transform module 1104 configured to convert symbols or otherwise modulated bits from the modulator 1102 into a time domain. In FIG. 11, the transform module 1104 is illustrated as being implemented by an inverse fast Fourier transform (IFFT) module. In some implementations, there may be multiple transform modules (not shown) that transform units of data of different sizes. In some implementations, the transform module 1104 may be itself configured to transform units of data of different sizes. For example, the transform module 1104 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1104 may be referred to as the size of the transform module 1104.

In FIG. 11, the modulator 1102 and the transform module 1104 are illustrated as being implemented in the DSP 1120. In some aspects, however, one or both of the modulator 1102 and the transform module 1104 are implemented in the processing system 1004 or in another element of the apparatus 1002t (e.g., see description above with reference to FIG. 10).

As discussed above, the DSP 1120 may be configured to generate a data unit for transmission. In some aspects, the modulator 1102 and the transform module 1104 may be configured to generate a data unit including a plurality of fields including control information and a plurality of data symbols.

Returning to the description of FIG. 11, the apparatus 1002t may further include a digital to analog converter 1106 configured to convert the output of the transform module into an analog signal. For example, the time-domain output of the transform module 1104 may be converted to a baseband OFDM signal by the digital to analog converter 1106. The digital to analog converter 1106 may be implemented in the processing system 1004 or in another element of the apparatus 1002 of FIG. 10. In some aspects, the digital to analog converter 1106 is implemented in the transceiver 1014 (FIG. 10) or in a data transmit processor.

The analog signal may be wirelessly transmitted by the transmitter 1110. The analog signal may be further processed before being transmitted by the transmitter 1110, for example by being filtered or by being upconverted to an intermediate or carrier frequency. In the aspect illustrated in FIG. 11, the transmitter 1110 includes a transmit amplifier 1108. Prior to being transmitted, the analog signal may be amplified by the transmit amplifier 1108. In some aspects, the amplifier 1108 may include a low noise amplifier (LNA).

The transmitter 1110 is configured to transmit one or more packets or data units in a wireless signal based on the analog signal. The data units may be generated using the processing system 1004 (FIG. 10) and/or the DSP 1120, for example using the modulator 1102 and the transform module 1104 as discussed above. Data units that may be generated and transmitted as discussed above are described in additional detail below.

Figure 12:
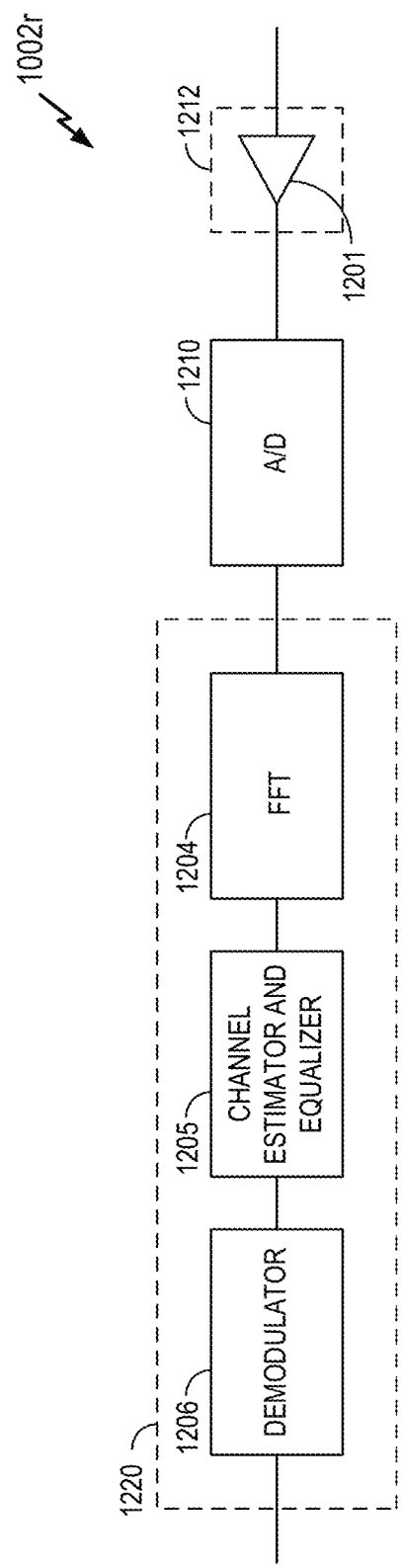
FIG. 12 is a functional block diagram of example components that may be utilized in the apparatus of FIG. 10 to receive wireless communication.

FIG. 12 illustrates various components that may be utilized in the apparatus 1002 of FIG. 10 to receive wireless communication. The components illustrated in FIG. 12 may be used, for example, to receive OFDM communication. For example, the components illustrated in FIG. 12 may be used to receive data units transmitted by the components discussed above with respect to FIG. 11.

The receiver 1212 of apparatus 1002r is configured to receive one or more packets or data units in a wireless signal. Data units that may be received and decoded or otherwise processed as discussed below.

In the aspect illustrated in FIG. 12, the receiver 1212 includes a receive amplifier 1201. The receive amplifier 1201 may be configured to amplify the wireless signal received by the receiver 1212. In some aspects, the receiver 1212 is configured to adjust the gain of the receive amplifier 1201 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1201 may include an LNA.

The apparatus 1002r may include an analog to digital converter 1210 configured to convert the amplified wireless signal from the receiver 1212 into a digital representation thereof. Further to being amplified, the wireless signal may be processed before being converted by the analog to digital converter 1210, for example by being filtered or by being downconverted to an intermediate or baseband frequency. The analog to digital converter 1210 may be implemented in the processing system 1004 (FIG. 10) or in another element of the apparatus 1002r. In some aspects, the analog to digital converter 1210 is implemented in the transceiver 1014 (FIG. 10) or in a data receive processor.

The apparatus 1002r may further include a transform module 1204 configured to convert the representation of the wireless signal into a frequency spectrum. In FIG. 12, the transform module 1204 is illustrated as being implemented by a fast Fourier transform (FFT) module. In some aspects, the transform module may identify a symbol for each point that it uses. As described above with reference to FIG. 11, the transform module 1204 may be configured with a plurality of modes, and may use a different number of points to convert the signal in each mode. The number of points used by the transform module 1204 may be referred to as the size of the transform module 1204. In some aspects, the transform module 1204 may identify a symbol for each point that it uses.

The apparatus 1002r may further include a channel estimator and equalizer 1205 configured to form an estimate of the channel over which the data unit is received, and to remove certain effects of the channel based on the channel estimate. For example, the channel estimator and equalizer 1205 may be configured to approximate a function of the channel, and the channel equalizer may be configured to apply an inverse of that function to the data in the frequency spectrum.

The apparatus 1002r may further include a demodulator 1206 configured to demodulate the equalized data. For example, the demodulator 1206 may determine a plurality of bits from symbols output by the transform module 1204 and the channel estimator and equalizer 1205, for example by reversing a mapping of bits to a symbol in a constellation. The bits may be processed or evaluated by the processing system 1004 (FIG. 10), or used to display or otherwise output information to the user interface 1022 (FIG. 10). In this way, data and/or information may be decoded. In some aspects, the bits correspond to codewords. In one aspect, the demodulator 1206 may include a QAM (quadrature amplitude modulation) demodulator, for example an 8-QAM demodulator or a 64-QAM demodulator. In other aspects, the demodulator 1206 may include a binary phase-shift keying (BPSK) demodulator or a quadrature phase-shift keying (QPSK) demodulator.

In FIG. 12, the transform module 1204, the channel estimator and equalizer 1205, and the demodulator 1206 are illustrated as being implemented in the DSP 1220. In some aspects, however, one or more of the transform module 1204, the channel estimator and equalizer 1205, and the demodulator 1206 are implemented in the processing system 1004 (FIG. 10) or in another element of the apparatus 1002 (FIG. 10).

As discussed above, the wireless signal received at the receiver 1012 may include one or more data units. Using the functions or components described above, the data units or data symbols therein may be decoded evaluated or otherwise evaluated or processed. For example, the processing system 1004 (FIG. 10) and/or the DSP 1220 may be used to decode data symbols in the data units using the transform module 1204, the channel estimator and equalizer 1205, and the demodulator 1206.

Data units exchanged by the AP 904 and the STA 906 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1002*t* shown in FIG. 11 is an example of a single transmit chain used for transmitting via an antenna. The apparatus 1002*r* shown in FIG. 12 is an example of a single receive chain used for receiving via an antenna. In some implementations, the apparatus 1002*t* or 1002*r* may implement a portion of a MIMO system using multiple antennas to simultaneously transmit data.

The wireless communication system 900 may employ methods to allow efficient access of the wireless medium based on unpredictable data transmissions while avoiding collisions. As such, in accordance with various aspects, the wireless communication system 900 performs carrier sense multiple access/collision avoidance (CSMA/CA) that may be referred to as the Distributed Coordination Function (DCF). More generally, an apparatus 1002 having data for transmission senses the wireless medium to determine if the channel is already occupied. If the apparatus 1002 senses the channel is idle, then the apparatus 1002 transmits prepared data. Otherwise, the apparatus 1002 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may be implemented as a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may be implemented as an access point, a relay, or an access terminal.

An access terminal may include, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may be implemented as a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may include, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may include, be implemented as, or known as a relay node, a relay device, a relay station, a relay apparatus, or some other similar terminology. As discussed above, in some aspects, a relay may include some access terminal functionality and some access point functionality.

In some aspects, a wireless apparatus may include an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS 856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3$^{rd}$ Generation Partnership Project" (3GPP), while cdma2000 is described in documents from an organization named "3$^{rd}$ Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Example Communication Device

Figure 13:
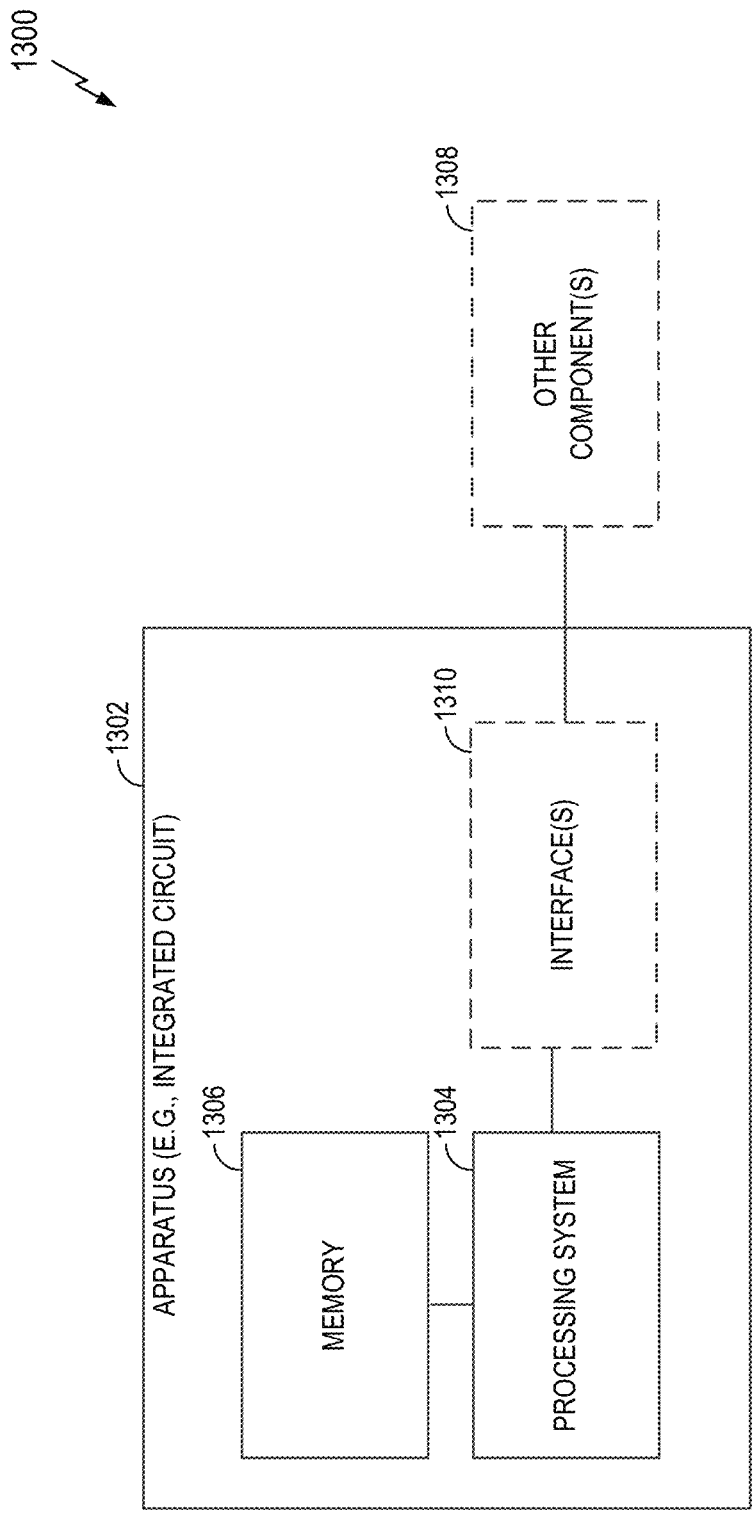
FIG. 13 is a functional block diagram of an example apparatus in accordance with some aspects of the disclosure.

FIG. 13 illustrates an example apparatus 1300 (e.g., an AP, an AT, or some other type of wireless communication node) according to certain aspects of the disclosure. The apparatus 1300 includes an apparatus 1302 (e.g., an integrated circuit) and, optionally, at least one other component 1308. In some aspects, the apparatus 1302 may be configured to operate in a wireless communication node (e.g., an AP or an AT) and to perform one or more of the operations described herein. For convenience, a wireless communication node may be referred to herein as a wireless node. In some aspects, the apparatus 1300 may correspond to the first apparatus 202 of FIG. 2 or the first apparatus 302 of FIG. 3. The apparatus 1302 includes a processing system 1304, and a memory 1306 coupled to the processing system 1304. Example implementations of the processing system 1304 are provided herein. In some aspects, the processing system 1304 and the memory 1306 of FIG. 13 may correspond to the processing system 1004 and the memory component 1006 of FIG. 10.

The processing system 1304 is generally adapted for processing, including the execution of such programming stored on the memory 1306. For example, the memory 1306 may store instructions that, when executed by the processing system 1304, cause the processing system 1304 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 1302 communicates with at least one other component (e.g., a component 1308 external to the apparatus 1302) of the apparatus 1300. To this end, in some implementations, the apparatus 1302 may include at least one interface 1310 (e.g., a send/receive interface) coupled to the processing system 1304 for outputting and/or obtaining (e.g., sending and/or receiving) information (e.g., received information, generated information, decoded information, messages, etc.) between the processing system 1304 and the other component 1308. In some implementations, the interface 1310 may include an interface bus, bus drivers, bus receivers, other suitable circuitry, or a combination thereof. In some implementations, the interface 1310 may include radio frequency (RF) circuitry (e.g., an RF transmitter and/or an RF receiver). In some implementations, the interface 1310 may be configured to interface the apparatus 1302 to one or more other components of the apparatus 1300 (other components not shown in FIG. 13). For example, the interface 1310 may be configured to interface the processing system 1304 to a radio frequency (RF) front end (e.g., an RF transmitter and/or am RF receiver). In some implementations, a first interface and a second interface may correspond to the same interface. For example, an input/output interface (e.g., a transceiver or bus interface) may include a first interface (e.g., an input interface) and a second interface (e.g., an output interface).

The apparatus 1302 may communicate with other apparatuses in various ways. In cases where the apparatus 1302 include an RF transceiver (not shown in FIG. 13), the apparatus may transmit and receive information (e.g. a frame, a message, bits, etc.) via RF signaling. In some cases, rather than transmitting information via RF signaling, the apparatus 1302 may have an interface to provide (e.g., output, send, transmit, etc.) information for RF transmission. For example, the processing system 1304 may output information, via a bus interface, to an RF front end for RF transmission. Similarly, rather than receiving information via RF signaling, the apparatus 1302 may have an interface to obtain information that is received by another apparatus. For example, the processing system 1304 may obtain (e.g., receive) information, via a bus interface, from an RF receiver that received the information via RF signaling.

Example Processes

Figure 14:
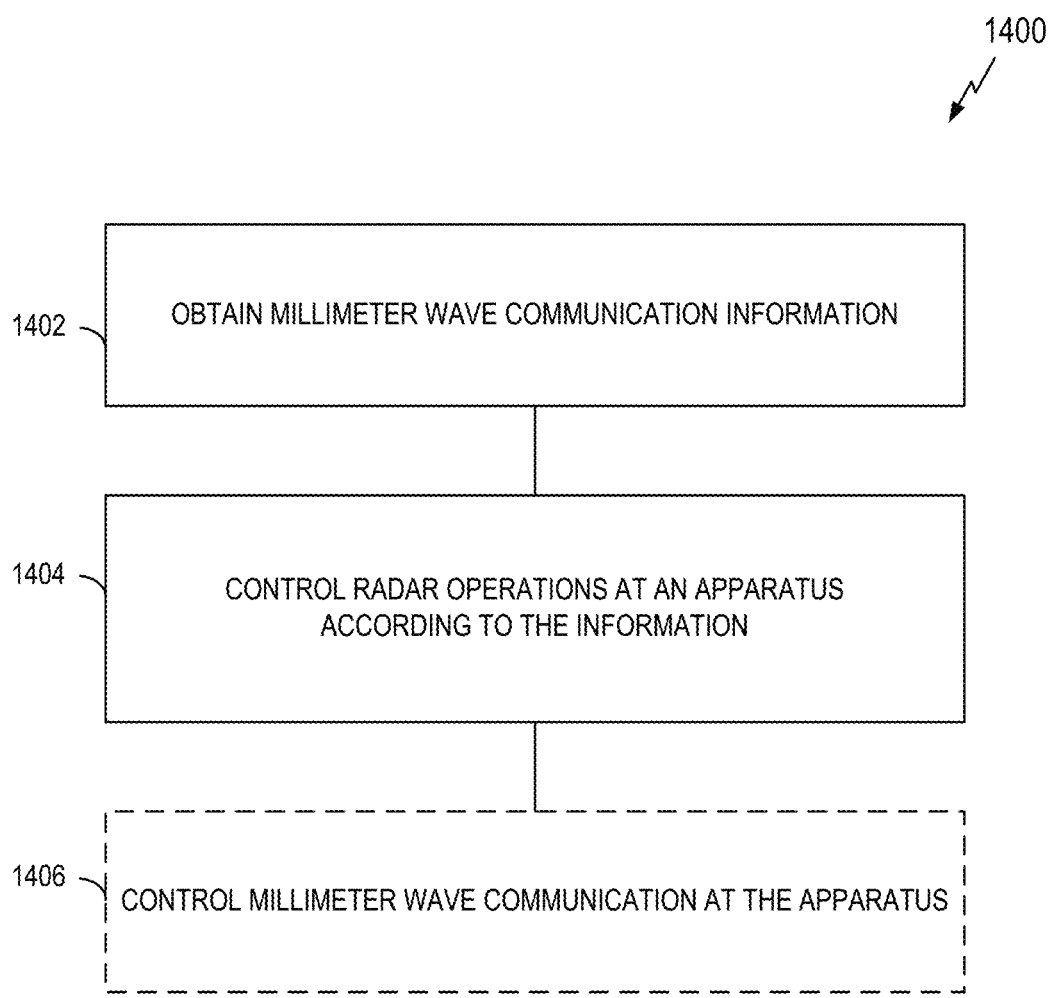
FIG. 14 is a flow diagram of an example process in accordance with some aspects of the disclosure.

FIG. 14 illustrates a process 1400 for communication in accordance with some aspects of the disclosure. The process 1400 may take place within a processing system (e.g., the processing system 1304 of FIG. 13), which may be located in an AP, an AT, or some other suitable apparatus. Of course, in various aspects within the scope of the disclosure, the process 1400 may be implemented by any suitable apparatus capable of supporting communication-related operations in accordance with the teachings herein.

At block 1402, an apparatus (e.g., a chip or a receiving wireless node) obtains millimeter wave communication information. For example, a chip (e.g., an integrated circuit) may obtain a received frame (e.g., received by a receiver). As another example, a receiver may receive the frame.

At block 1404, the apparatus controls a radar operation at the apparatus according to the millimeter wave communication information.

In some aspects, the millimeter wave communication information may include base station signaling detected on a first millimeter wave channel. In this case, the control of the radar operation may include electing to use a second millimeter wave channel for the radar operation after obtaining the millimeter wave communication information that includes the base station signaling detected on the first millimeter wave channel. For example, the control of the radar operations may include electing to use the second millimeter wave channel for the radar operations as a result of the detection of the base station signaling on the first millimeter wave channel.

In some aspects, the millimeter wave communication information may indicate that a basic service set was detected on a first millimeter wave channel. In this case, the control of the radar operation may include electing to use a second millimeter wave channel for the radar operation after obtaining the millimeter wave communication information that indicates that the basic service set was detected on the first millimeter wave channel. For example, the control of the radar operations may include electing to use the second millimeter wave channel for the radar operations as a result of the detection of the basic service set on the first millimeter wave channel.

In some aspects, the millimeter wave communication information may include control allocation signaling. In this case, the control of the radar operation may include determining whether the control allocation signaling indicates that a channel can be used for the radar operation and commencing the radar operation if the channel can be used for the radar operation. For example, the apparatus may start sending radar signals when the channel is available for the radar operation.

In some aspects, the millimeter wave communication information may include clear channel assessment information. In this case, the control of radar operation may include determining whether the clear channel assessment information indicates that a channel can be used for the radar operation and commencing the radar operation if the channel can be used for the radar operation.

In some aspects, the millimeter wave communication information may include a network allocation vector. In this case, the control of radar operation may include delaying the radar operation for a period of time based on the network allocation vector.

In some aspects, the millimeter wave communication information may include a sleep period advertised by a millimeter wave device. In this case, the control of radar operation may include conducting the radar operation during the sleep period. In some aspects, the sleep period may include an IEEE 802.11 doze period.

In some aspects, the millimeter wave communication information may include a communication interval advertised by a millimeter wave device. In this case, the control of radar operation may include conducting the radar operation during a period of time indicated by the communication interval. In some aspects, the communication interval may include a beacon time interval (BTI).

In some aspects, the millimeter wave communication information may include an allocation period. In this case, the control of radar operation may include conducting the radar operation during a period of time indicated by the allocation period. In some aspects, the allocation period may include an IEEE 802.11 service period allocation.

In some aspects, the millimeter wave communication information may include spatial information. In this case, the control of radar operation may include using the spatial information to avoid radar in at least one direction and allow radar in at least one other direction.

At optional block 1406, the apparatus may control millimeter wave communication at the apparatus. In some aspects, the radar operation and the millimeter wave communication may use the same frequency band. In some aspects, the millimeter wave communication may include IEEE 802.11 communication, LTE communication, 5G communication, or any combination thereof.

Figure 15:
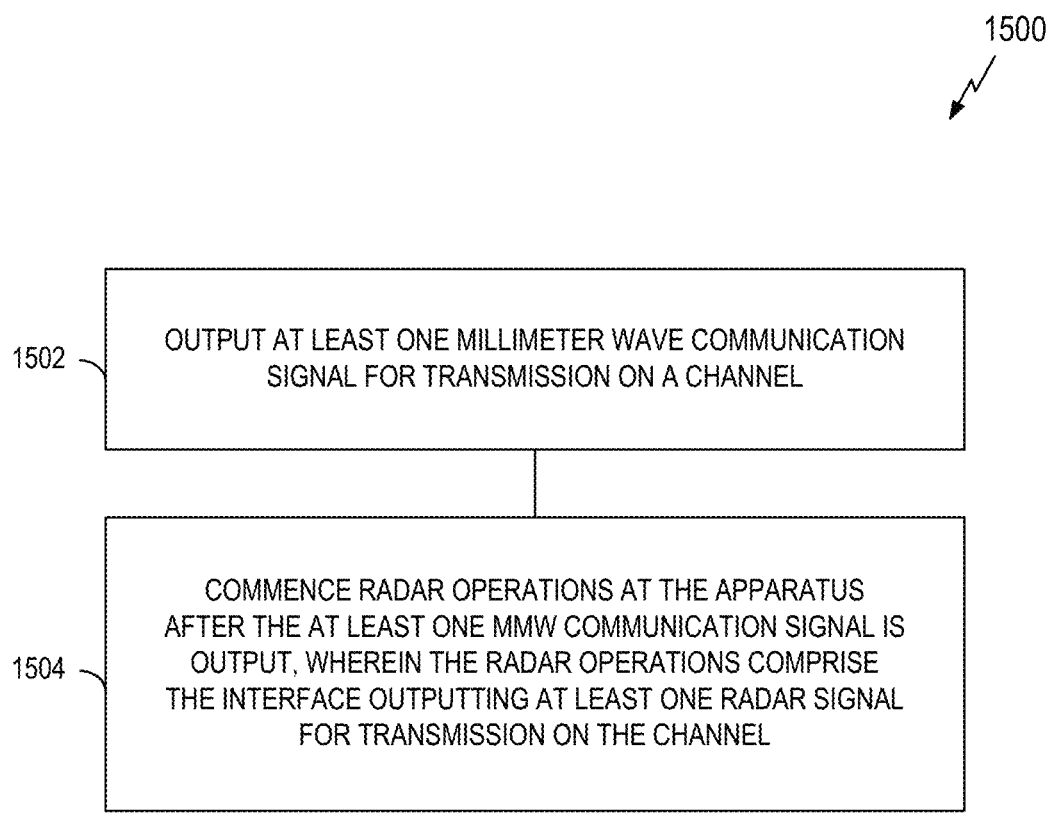
FIG. 15 is a flow diagram of an example process in accordance with some aspects of the disclosure.

FIG. 15 illustrates a process 1500 for communication in accordance with some aspects of the disclosure. The process 1500 may take place within a processing system (e.g., the processing system 1304 of FIG. 13), which may be located in an AP, an AT, or some other suitable apparatus. Of course, in various aspects within the scope of the disclosure, the process 1500 may be implemented by any suitable apparatus capable of supporting communication-related operations in accordance with the teachings herein.

At block 1502, an apparatus (e.g., a chip or a transmitting wireless node) outputs at least one millimeter wave communication signal for transmission on a channel. For example, a chip (e.g., an integrated circuit) may output the at least one millimeter wave communication signal for transmission (e.g., by a transmitter). As another example, a transmitter may transmit the at least one millimeter wave communication signal.

In some aspects, the at least one millimeter wave communication signal may include (e.g., may be) at least one control allocation signal. In some aspects, the at least one millimeter wave communication signal may include (e.g., may be) a request-to-send (RTS). In some aspects, the at least one millimeter wave communication signal may include (e.g., may be) a clear-to-send (CTS). In some aspects, the at least one millimeter wave communication signal may include (e.g., may be) a clear-to-send-to-self (CTS2S). In some aspects, the at least one millimeter wave communication signal may include (e.g., may be) a directional multi-gigabit clear-to-send (DMG CTS). In some aspects, the at least one millimeter wave communication signal may include (e.g., may be) at least one training signal. In some aspects, the at least one millimeter wave communication signal may include (e.g., may be) a sector sweep (SSW) frame. In some aspects, the at least one millimeter wave communication signal may include (e.g., may be) a short sector sweep (SSSW) frame. In some aspects, the at least one millimeter wave communication signal may include (e.g., may be) signals for transmission via a directed mode. In some aspects, the at least one millimeter wave communication signal may include (e.g., may be) signals for transmission via an omni-directional mode.

At block 1504, the apparatus commences a radar operation at the apparatus after the at least one millimeter wave communication signal is output. In some aspects, the radar operation may involve the interface outputting at least one radar signal for transmission on the channel.

In some aspects, the radar operation and the at least one millimeter wave communication signal may use the same frequency band. In some aspects, the at least one millimeter wave communication signal may include (e.g., may be) at least one IEEE 802.11 communication signal, at least one LTE communication signal, at least one 5G communication signal, or any combination thereof.

Figure 16:
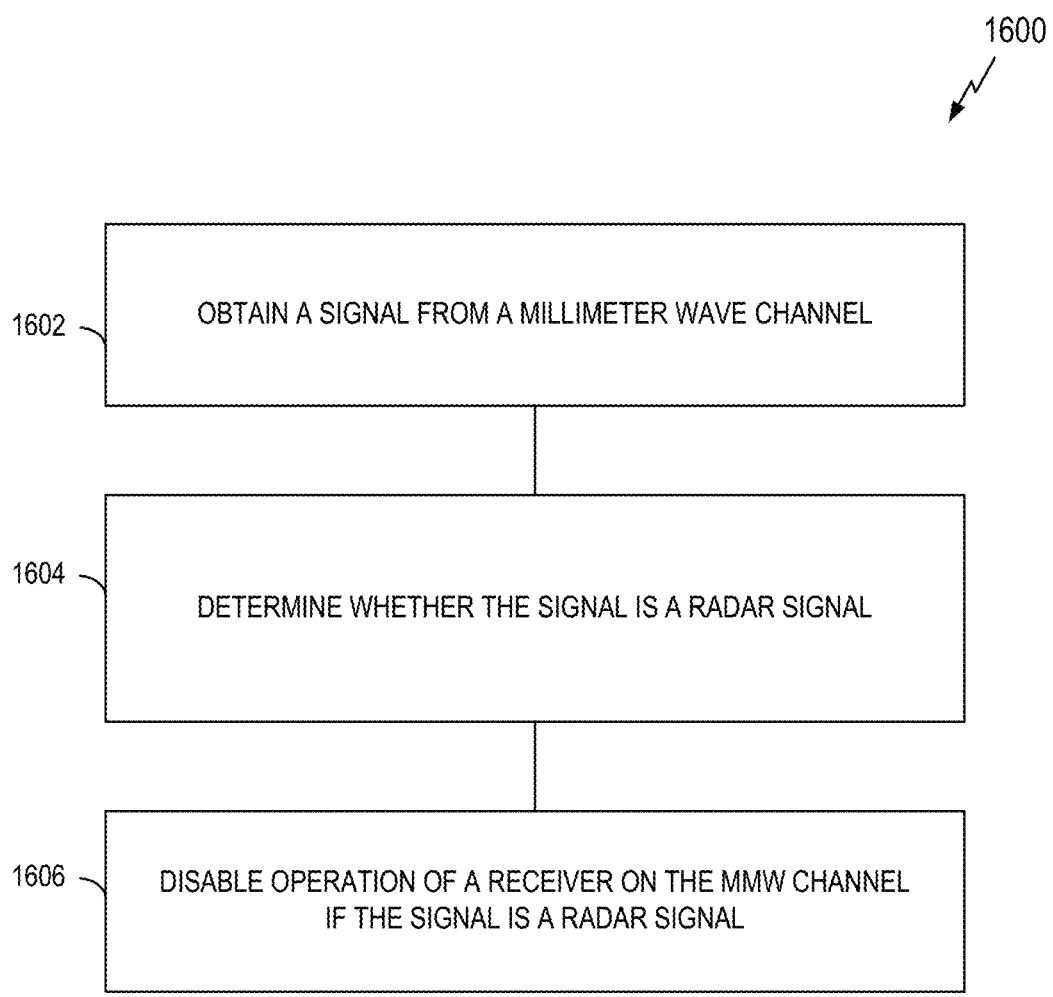
FIG. 16 is a flow diagram of an example process in accordance with some aspects of the disclosure.

FIG. 16 illustrates a process 1600 for communication in accordance with some aspects of the disclosure. The process 1600 may take place within a processing system (e.g., the processing system 1304 of FIG. 13), which may be located in an AP, an AT, or some other suitable apparatus. Of course, in various aspects within the scope of the disclosure, the process 1600 may be implemented by any suitable apparatus capable of supporting communication-related operations in accordance with the teachings herein.

At block 1602, an apparatus (e.g., a chip or a receiving wireless node) obtains a signal from a millimeter wave channel. For example, a chip (e.g., an integrated circuit) may obtain a receive signal (e.g., received by a receiver). As another example, a receiver may receive the signal.

In some aspects, the signal may be less than 100 milliseconds in duration. In some aspects, the signal may include a Golay sequence, a chirp signal, an orthogonal frequency divisional multiplex (OFDM) signal, or any combination thereof.

At block 1604, the apparatus determines whether the signal is a radar signal.

At block 1606, the apparatus disables operation of a receiver and/or a transmitter on the millimeter wave channel if the signal is a radar signal. In some aspects, the operation of the receiver and/or the transmitter on the millimeter wave channel may include IEEE 802.11 communication, LTE communication, 5G communication, or any combination thereof.

In some aspects, an apparatus may perform any combination of the operations described above.

Example Apparatuses

Figure 17:
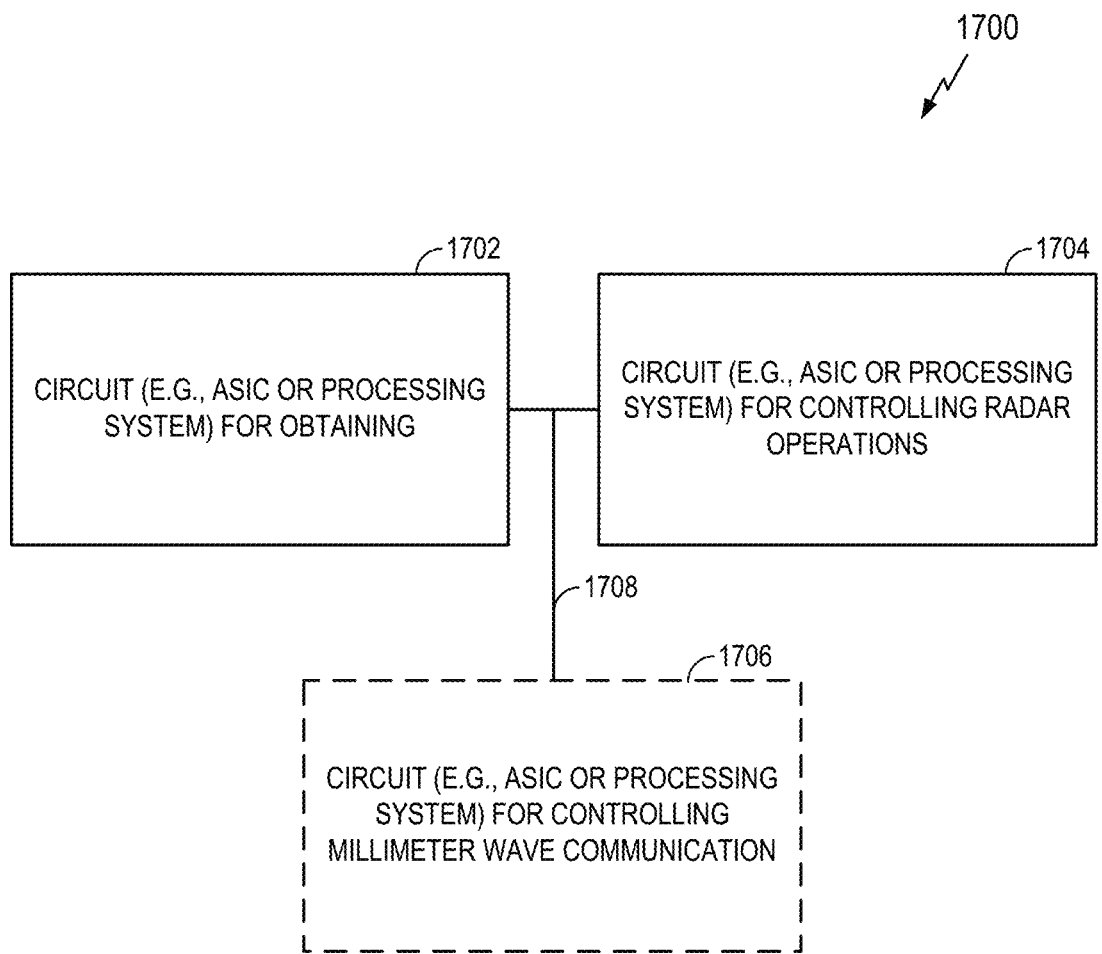
FIG. 17 is a simplified block diagram of several sample aspects of an apparatus configured with functionality in accordance with some aspects of the disclosure.
Figure 18:
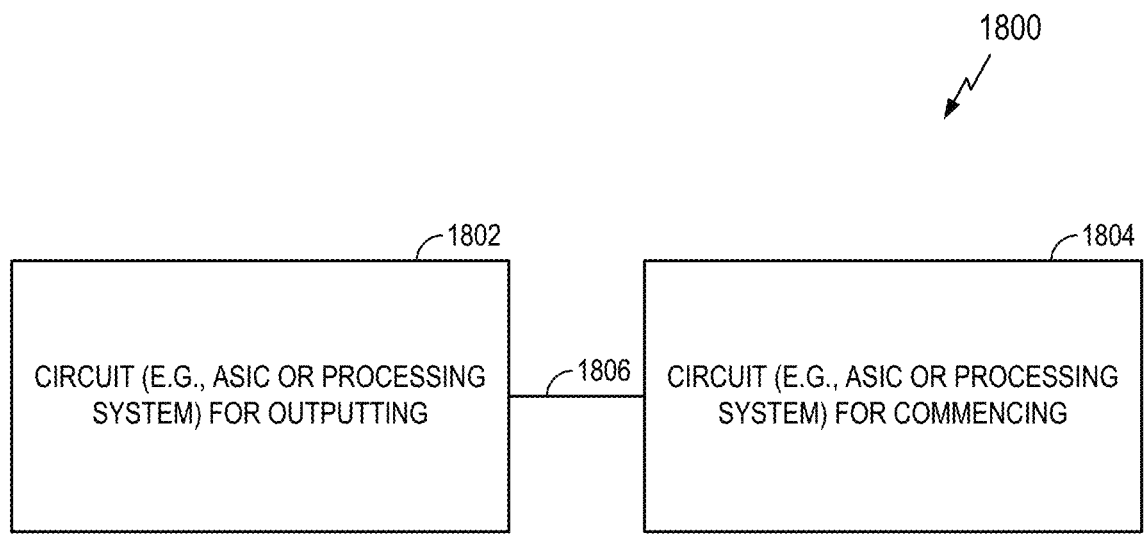
FIG. 18 is a simplified block diagram of several sample aspects of an apparatus configured with functionality in accordance with some aspects of the disclosure.
Figure 19:
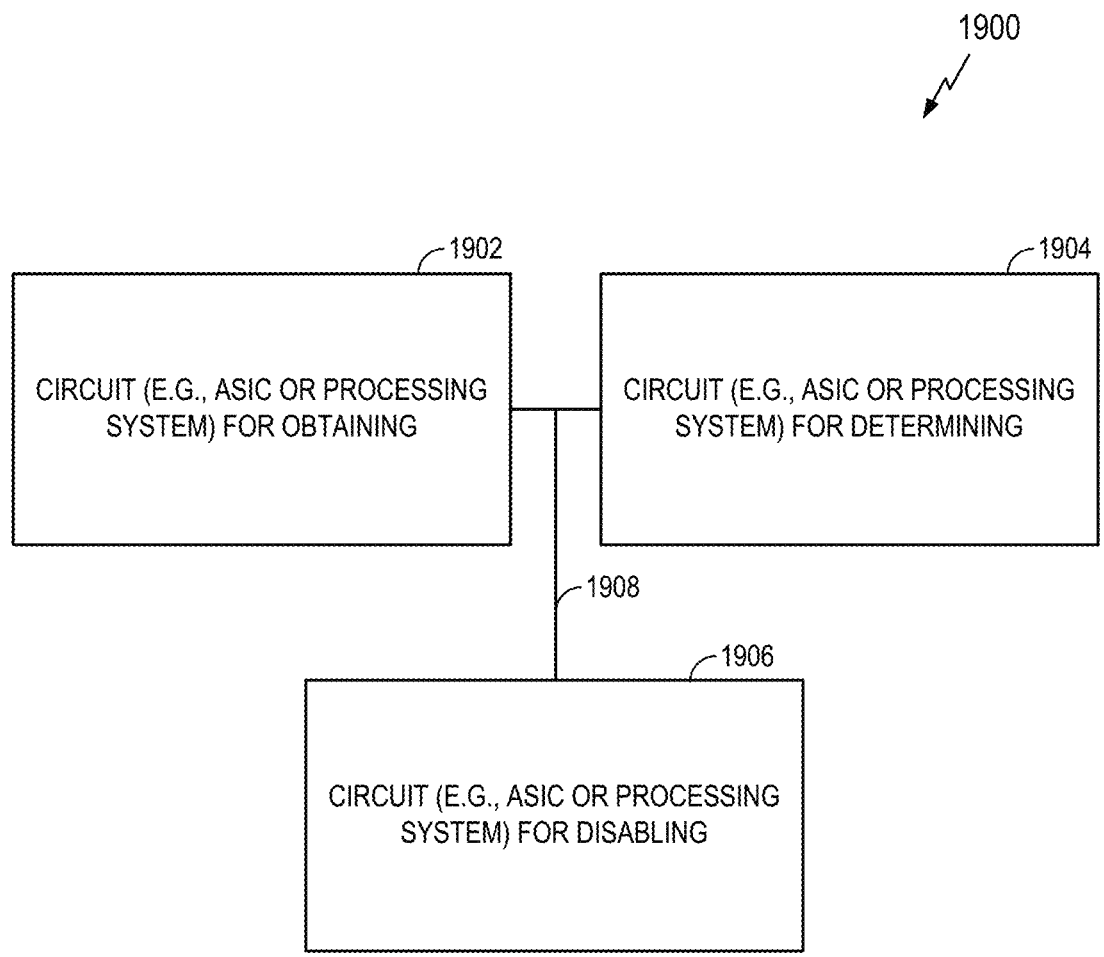
FIG. 19 is a simplified block diagram of several sample aspects of an apparatus configured with functionality in accordance with some aspects of the disclosure.

The components described herein may be implemented in a variety of ways. Referring to FIGS. 17, 18, and 19, apparatuses 1700, 1800, and 1900 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 1700 includes one or more components (modules) that may perform one or more of the functions described herein with regard to various figures. For example, a circuit (e.g., an ASIC or processing system) for obtaining 1702, e.g., a means for obtaining, may correspond to, for example, an interface (e.g., a bus interface, a send/receive interface, or some other type of signal interface), a communication device, a transceiver, a receiver, a processing system, or some other similar component as discussed herein. A circuit (e.g., an ASIC or processing system) for controlling radar operations 1704, e.g., a means for controlling radar operations, may correspond to, for example, a processing system as discussed herein. A circuit (e.g., an ASIC or processing system) for controlling millimeter wave communication 1706, e.g., a means for controlling millimeter wave communication, may correspond to, for example, a processing system as discussed herein. Two or more of the modules of FIG. 17 may communicate with each other or some other component via a signaling bus 1708. In various implementations, the processing system 1004 of FIG. 10 and/or the processing system 1304 of FIG. 13 may include one or more of the circuit for obtaining 1702, the circuit for controlling radar operations 1704, or the circuit for controlling millimeter wave communication 1706.

The apparatus 1800 includes one or more components (modules) that may perform one or more of the functions described herein with regard to various figures. For example, a circuit (e.g., an ASIC or processing system) for outputting 1802, e.g., a means for outputting, may correspond to, for example, an interface (e.g., a bus interface, a send/receive interface, or some other type of signal interface), a communication device, a transceiver, a transmitter, a processing system, or some other similar component as discussed herein. A circuit (e.g., an ASIC or processing system) for commencing 1804, e.g., a means for commencing, may correspond to, for example, a processing system as discussed herein. The modules of FIG. 18 may communicate with each other or some other component via a signaling bus 1806. In various implementations, the processing system 1004 of FIG. 10 and/or the processing system 1304 of FIG. 13 may include one or more of the circuit for outputting 1802 or the circuit for commencing 1804.

The apparatus 1900 includes one or more components (modules) that may perform one or more of the functions described herein with regard to various figures. For example, a circuit (e.g., an ASIC or processing system) for obtaining 1902, e.g., a means for obtaining, may correspond to, for example, an interface (e.g., a bus interface, a send/receive interface, or some other type of signal interface), a communication device, a transceiver, a receiver, a processing system, or some other similar component as discussed herein. A circuit (e.g., an ASIC or processing system) for determining 1904, e.g., a means for determining, may correspond to, for example, a processing system as discussed herein. A circuit (e.g., an ASIC or processing system) for disabling 1906, e.g., a means for disabling, may correspond to, for example, a processing system as discussed herein. Two or more of the modules of FIG. 19 may communicate with each other or some other component via a signaling bus 1908. In various implementations, the processing system 1004 of FIG. 10 and/or the processing system 1304 of FIG. 13 may include one or more of the circuit for obtaining 1902, the circuit for determining 1904, or the circuit for disabling 1906.

As noted above, in some aspects, these modules may be implemented via appropriate processor components. These processor components may, in some aspects, be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects, one or more of any components represented by dashed boxes may be optional.

As noted above, the apparatuses 1700, 1800, and 1900 may be implemented as one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1700 may be implemented as a single device (e.g., with the circuit for obtaining 1702, the circuit for controlling radar operations 1704, and the circuit for controlling millimeter wave communication 1706 implemented as different sections of an ASIC). As another specific example, the apparatus 1700 may be implemented as several devices (e.g., with the circuit for controlling radar operations 1704 and the circuit for controlling millimeter wave communication 1706 implemented as one ASIC, and the circuit for obtaining 1702 implemented as another ASIC).

In addition, the components and functions represented by FIGS. 17-19 as well as other components and functions described herein, may be implemented using any suitable means. Such means are implemented, at least in part, using corresponding structure as taught herein. For example, the components described above in conjunction with the "ASIC for" components of FIGS. 17-19 correspond to similarly designated "means for" functionality. Thus, one or more of such means is implemented using one or more of processor components, integrated circuits, or other suitable structure as taught herein in some implementations. Several examples follow. A means for obtaining (e.g., mmW communication information, a signal from a channel, or other information) may determine where to obtain information (e.g., from a memory device, a receiver, some other component, or some other apparatus), process the information if needed, and output the information to an appropriate destination (e.g., a memory device, or some other component), and perform other related operations as described herein. A means for controlling radar operations may acquire information (e.g., mmW communication information) upon which the control is to be based (e.g., from a memory device or some other component), make a decision based on the information (e.g., determine whether to perform or how to modify a radar operation), output a result of the decision (e.g., to a memory device, a transmitter, or some other component), and perform other related operations as described herein. A means for controlling mmW communication may acquire information upon which the control is to be based (e.g., from a memory device or some other component), make a decision based on the information (e.g., determine whether to perform or how to communicate on channel), output a result of the decision (e.g., to a memory device, a transceiver, or some other component), and perform other related operations as described herein. A means for outputting (e.g., a signal, or other information) may obtain information to be output (e.g., from a memory device or some other component), format the information if needed, send the information to an appropriate destination (e.g., a memory device, a transmitter, some other component, or some other apparatus), and perform other related operations as described herein. A means for commencing (e.g., radar operations) may acquire information upon which a determination to commence is to be based (e.g., from a memory device or some other component), make a decision based on the information (e.g., determine whether to initiate a radar operation), output a result of the decision (e.g., to a memory device, a transmitter, or some other component), and perform other related operations as described herein. A means for determining (e.g., whether a signal is a radar signal) may obtain information (e.g., the signal) from a component of the apparatus (e.g., from a memory device, a transceiver, or some other component), operate on the information (e.g., determine whether the signal includes a Golay sequence, a chirp signal, etc.), output the result of the operation (e.g., output an indication of whether the signal is a radar signal to a memory device or some other component), and perform other related operations as described herein. A means for disabling (e.g., operation of a receiver) may acquire information (e.g., an indication of whether a signal is a radar signal) upon which the disabling is to be based (e.g., from a means for determining, a memory device, or some other component), make a decision based on the information (e.g., determine whether to disable at least one operation of a receiver), output a result of the decision (e.g., to a memory device, a transceiver, or some other component), and perform other related operations as described herein.

The various operations of methods described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the process 1400 illustrated in FIG. 14 may correspond at least in some aspects, to corresponding blocks of the apparatus 1700 illustrated in FIG. 17. As another example, the blocks of the process 1500 illustrated in FIG. 15 may correspond at least in some aspects, to corresponding blocks of the apparatus 1800 illustrated in FIG. 18. As yet another example, the blocks of the process 1600 illustrated in FIG. 16 may correspond at least in some aspects, to corresponding blocks of the apparatus 1900 illustrated in FIG. 19.

Example Programming

Figure 20:
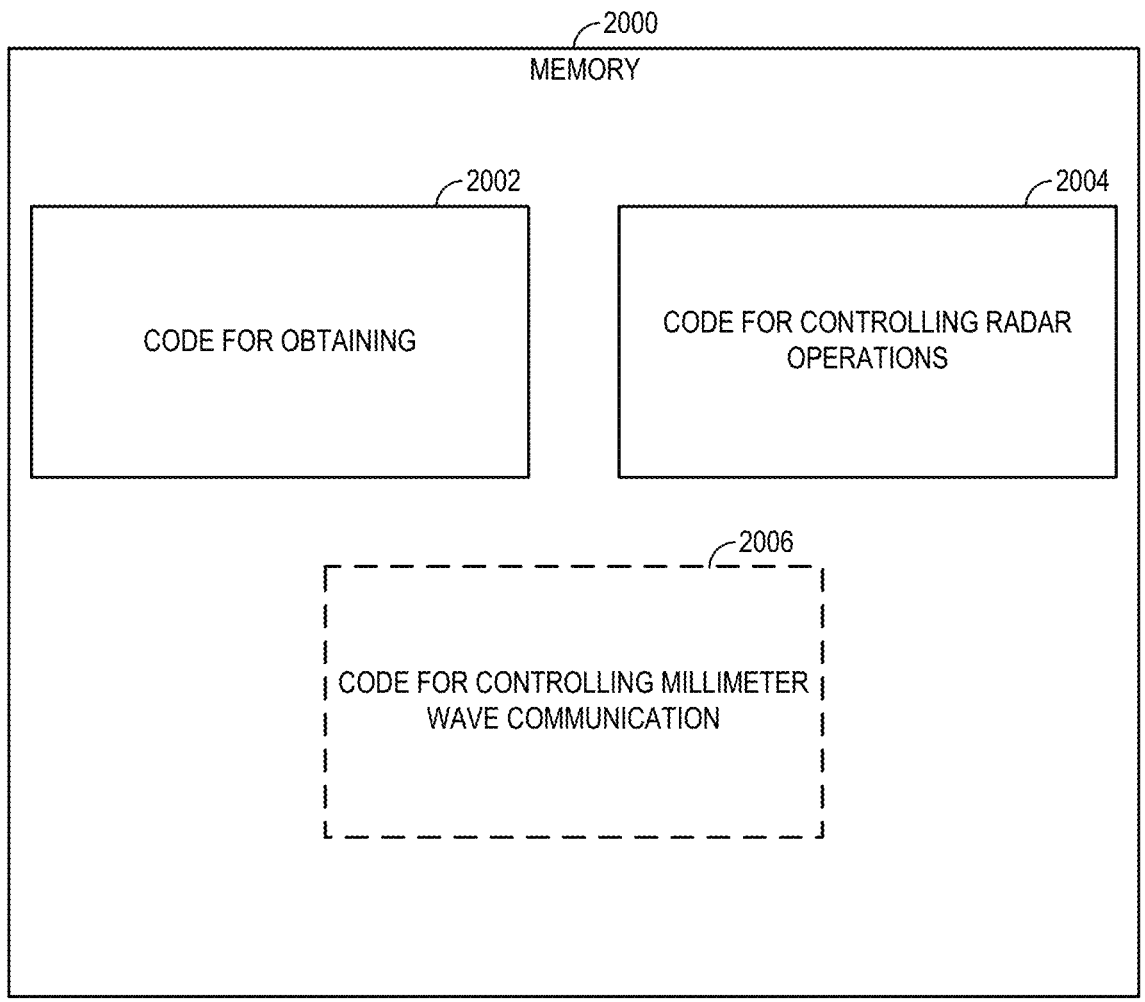
FIG. 20 is a simplified block diagram of several sample aspects of a memory configured with code in accordance with some aspects of the disclosure.
Figure 21:
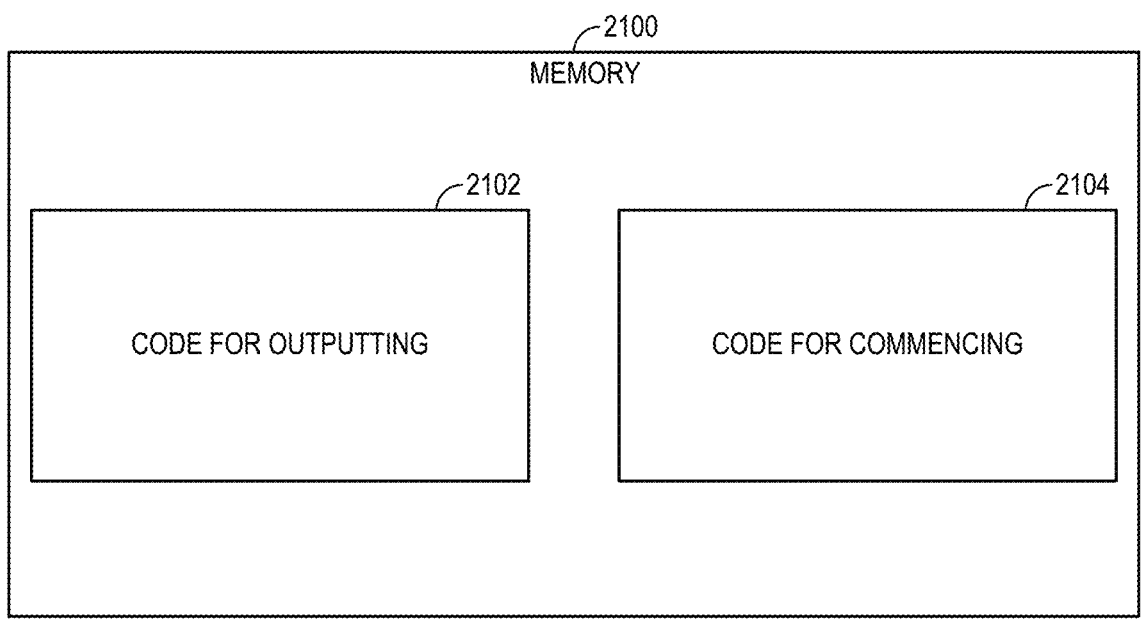
FIG. 21 is a simplified block diagram of several sample aspects of a memory configured with code in accordance with some aspects of the disclosure.
Figure 22:
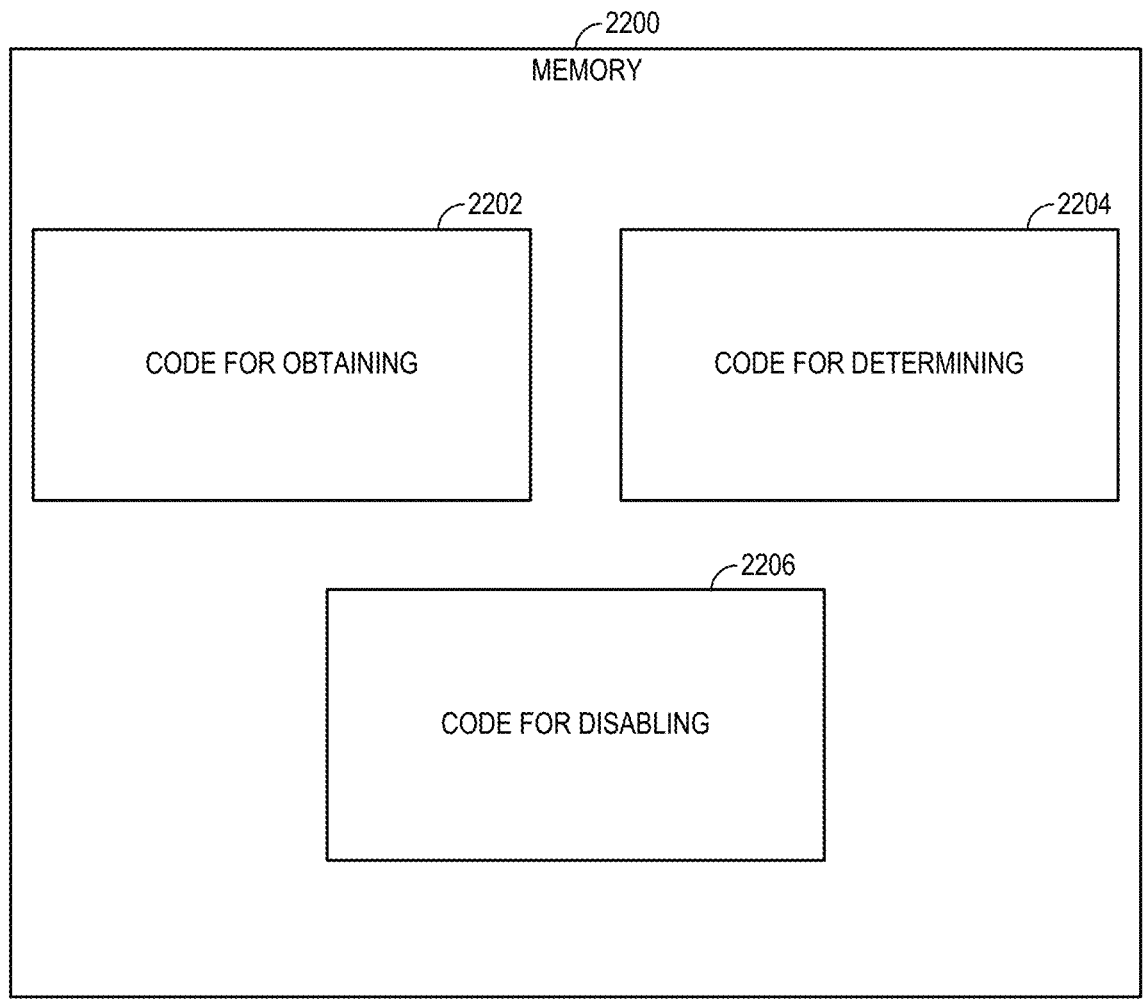
FIG. 22 is a simplified block diagram of several sample aspects of a memory configured with code in accordance with some aspects of the disclosure.

Referring to FIGS. 20, 21, and 22, programming stored by a memory 2000, a memory 2100, or a memory 2200 (e.g. a storage medium, a memory device, etc.), when executed by a processing system (e.g., the processing system 1304 of FIG. 13), causes the processing system to perform one or more of the various functions and/or process operations described herein. For example, the programming, when executed by the processing system 1304, may cause the processing system 1304 to perform the various functions, steps, and/or processes described herein with respect to FIGS. 1-6 and 14-16 in various implementations.

As shown in FIG. 20, the memory 2000 may include one or more of code for obtaining 2002, code for controlling radar operations 2004, or optional code for controlling millimeter wave operations 2006. In some aspects, one of more of the code for obtaining 2002, the code for controlling radar operations 2004, or the code for controlling millimeter wave operations 2006 may be executed or otherwise used to provide the functionality described herein for the circuit for obtaining 1702, the circuit for controlling radar operations 1704, or the circuit for controlling millimeter wave communication 1706. In some aspects, the memory 2000 may correspond to the memory 1306 of FIG. 13.

As shown in FIG. 21, the memory 2100 may include one or more of code for outputting 2102 or code for commencing 2104. In some aspects, one of more of the code for outputting 2102 or the code for commencing 2104 may be executed or otherwise used to provide the functionality described herein for the circuit for outputting 1802 or the circuit for commencing 1804. In some aspects, the memory 2100 may correspond to the memory 1306 of FIG. 13.

As shown in FIG. 22, the memory 2200 may include one or more of code for obtaining 2202, code for determining 2204, or code for disabling 2206. In some aspects, one of more of the code for obtaining 2202, the code for determining 2204, or the code for disabling 2206 may be executed or otherwise used to provide the functionality described herein for the circuit for obtaining 1902, the circuit for determining 1904, or the circuit for disabling 1906. In some aspects, the memory 2200 may correspond to the memory 1306 of FIG. 13.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein (e.g., computer-readable medium storing computer-executable code, including code to perform the functionality described herein). Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, the apparatus supporting a millimeter wave communication and a radar operation, and the apparatus comprising:
   an interface configured to obtain millimeter wave communication information from another apparatus, wherein the obtained millimeter wave communication information comprises information related to a first millimeter wave channel used for the millimeter wave communication between the apparatus and the another apparatus; and
   a processing system configured to control the radar operation at the apparatus for at least transmission of radar signals based on a type of the millimeter wave communication information obtained from the another apparatus,
   wherein the control of the radar operation comprises determining whether or when to perform the radar operation at the apparatus according to the type of the obtained millimeter wave communication information,
   wherein a determination of whether or when to perform the radar operation is performed after the millimeter wave communication information is obtained from the another apparatus, to avoid interference between the millimeter wave communication and the radar operation, and
   wherein the radar operation and the millimeter wave communication co-exist in a same frequency band.

2. The apparatus of claim 1, wherein:
   the millimeter wave communication information comprises a base station signaling detected on the first millimeter wave channel; and
   the control of the radar operation comprises electing to use a second millimeter wave channel for the radar operation after the obtaining of the millimeter wave communication information comprising the base station signaling detected on the first millimeter wave channel.

3. The apparatus of claim 1, wherein:
   the millimeter wave communication information indicates that a basic service set was detected on the first millimeter wave channel; and
   the control of the radar operation comprises electing to use a second millimeter wave channel for the radar operation after the obtaining of the millimeter wave communication information that indicates that the basic service set was detected on the first millimeter wave channel.

4. The apparatus of claim 1, wherein:
   the millimeter wave communication information comprises control allocation signaling; and
   the control of the radar operation comprises determining whether the control allocation signaling indicates that a channel can be used for the radar operation and commencing the radar operation if the channel can be used for the radar operation.

5. The apparatus of claim 1, wherein:
   the millimeter wave communication information comprises clear channel assessment information; and
   the control of the radar operation comprises determining whether the clear channel assessment information indicates that a channel can be used for the radar operation and commencing the radar operation if the channel can be used for the radar operation.

6. The apparatus of claim 1, wherein:
   the millimeter wave communication information comprises a network allocation vector; and
   the control of the radar operation comprises delaying the radar operation for a period of time based on the network allocation vector.

7. The apparatus of claim 1, wherein:
   the millimeter wave communication information comprises a sleep period advertised by a millimeter wave device; and the control of the radar operation comprises conducting the radar operation during the sleep period.

8. The apparatus of claim 1, wherein:
the millimeter wave communication information comprises a communication interval advertised by a millimeter wave device; and
the control of the radar operation comprises conducting the radar operation during a period of time indicated by the communication interval.

9. The apparatus of claim 8, wherein the communication interval comprises a beacon time interval.

10. The apparatus of claim 1, wherein:
the millimeter wave communication information comprises an allocation period; and
the control of the radar operation comprises conducting the radar operation during a period of time indicated by the allocation period.

11. The apparatus of claim 1, wherein the processing system is further configured to control the millimeter wave communication at the apparatus.

12. The apparatus of claim 1, wherein:
the millimeter wave communication information comprises spatial information; and
the control of the radar operation comprises using the spatial information to avoid radar in at least one direction and allow radar in at least one other direction.

13. An apparatus for communication in a network, the apparatus supporting a millimeter wave communication and a radar operation, and the apparatus comprising:
an interface configured to output, before a radar scan is started, at least one millimeter wave communication signal for transmission on a channel to inform other plurality of apparatuses in the network regarding an ongoing transmission of at least one radar signal; and
a processing system configured to commence the radar operation on the channel at the apparatus after the at least one millimeter wave communication signal is output, to avoid interference between the millimeter wave communication and the radar operation, wherein the radar operation comprises the interface outputting the at least one radar signal for the transmission on the channel,
wherein the radar operation and the millimeter wave communication co-exist in a same frequency band.

14. The apparatus of claim 13, wherein the at least one millimeter wave communication signal comprises at least one control allocation signal.

15. The apparatus of claim 13, wherein the at least one millimeter wave communication signal comprises a request-to-send or a clear to send.

16. The apparatus of claim 13, wherein the at least one millimeter wave communication signal comprises a clear-to-send-to-self.

17. The apparatus of claim 13, wherein the at least one millimeter wave communication signal comprises a directional multi-gigabit clear-to-send.

18. The apparatus of claim 13, wherein the at least one millimeter wave communication signal comprises at least one training signal.

19. The apparatus of claim 13, wherein the at least one millimeter wave communication signal comprises a sector sweep frame.

20. The apparatus of claim 13, wherein the at least one millimeter wave communication signal comprises a short sector sweep frame.

21. The apparatus of claim 13, wherein the at least one millimeter wave communication signal is for transmission via a directed mode.

22. The apparatus of claim 13, wherein the at least one millimeter wave communication signal is for transmission via an omni-directional mode.

* * * * *